United States Patent
Fortmann

(10) Patent No.: US 10,614,617 B2
(45) Date of Patent: Apr. 7, 2020

(54) SYSTEMS AND METHODS FOR DRIVER ASSISTANCE

(71) Applicant: Harman International Industries, Incorporated, Stamford, CT (US)

(72) Inventor: Gustavo Adolfo Fortmann, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 3 days.

(21) Appl. No.: 15/956,644

(22) Filed: Apr. 18, 2018

(65) Prior Publication Data

US 2018/0308275 A1    Oct. 25, 2018

Related U.S. Application Data

(60) Provisional application No. 62/488,599, filed on Apr. 21, 2017.

(51) Int. Cl.
| | |
|---|---|
| *G06F 3/01* | (2006.01) |
| *G06T 15/20* | (2011.01) |
| *G06K 9/00* | (2006.01) |
| *G05D 1/00* | (2006.01) |

(52) U.S. Cl.
CPC ......... *G06T 15/205* (2013.01); *G05D 1/0094* (2013.01); *G06K 9/00791* (2013.01); *G06K 9/00812* (2013.01); *G06T 2215/16* (2013.01)

(58) Field of Classification Search
CPC ............ G06K 9/00791; G06K 9/00812; G06T 15/205; G06T 2215/16
See application file for complete search history.

(56) References Cited

U.S. PATENT DOCUMENTS

| | | | |
|---|---|---|---|
| 7,161,616 B1* | 1/2007 | Okamoto | B60R 1/00 348/148 |
| 8,159,416 B1* | 4/2012 | Yum | G01C 23/00 340/973 |
| 9,222,800 B1* | 12/2015 | Scherer | G01C 23/005 |

(Continued)

FOREIGN PATENT DOCUMENTS

EP    2554434 A1    2/2013

OTHER PUBLICATIONS

IEEE Standards Association, IEEE Standard for Local and metropolitan area networks—Timing and Synchronization for Time-Sensitive Applications in Bridged Local Area Networks, IEEE Std 802.1AS-2011, Mar. 30, 2011, 292 pages.

(Continued)

*Primary Examiner* — Sultana M Zalalee
(74) *Attorney, Agent, or Firm* — McCoy Russell LLP

(57) ABSTRACT

Embodiments are disclosed for generating a virtual view that is at least partially decoupled from a view of one or more physical cameras. An example method includes capturing images from at least one physical camera, generating a virtual image of a virtual camera from the captured images of at least one physical camera, the virtual image having either a different viewpoint, a different orientation, or a different viewpoint and orientation than the images captured by at least one physical camera, and automatically maintaining the virtual position of the virtual camera, relative to a reference point, when the at least one physical camera moves relative to the reference point.

22 Claims, 25 Drawing Sheets

(56) References Cited

U.S. PATENT DOCUMENTS

| | | | | |
|---|---|---|---|---|
| 9,809,196 | B1* | 11/2017 | Penilla | H04N 7/181 |
| 10,330,479 | B2* | 6/2019 | Loomis | G01C 21/30 |
| 2009/0005961 | A1* | 1/2009 | Grabowski | G01C 21/365 |
| | | | | 701/532 |
| 2009/0040306 | A1* | 2/2009 | Foote | B60R 1/082 |
| | | | | 348/148 |
| 2012/0062743 | A1* | 3/2012 | Lynam | B60Q 9/005 |
| | | | | 348/148 |
| 2012/0257058 | A1* | 10/2012 | Kinoshita | G06T 3/0012 |
| | | | | 348/148 |
| 2013/0162639 | A1* | 6/2013 | Muench | G06T 19/006 |
| | | | | 345/419 |
| 2014/0022390 | A1* | 1/2014 | Blank | B60R 1/12 |
| | | | | 348/148 |
| 2014/0043473 | A1* | 2/2014 | Gupta | H04N 17/00 |
| | | | | 348/135 |
| 2014/0104424 | A1 | 4/2014 | Zhang et al. | |
| 2014/0132753 | A1* | 5/2014 | Watanabe | B60R 1/00 |
| | | | | 348/116 |
| 2014/0152778 | A1* | 6/2014 | Ihlenburg | G06T 15/205 |
| | | | | 348/47 |
| 2014/0267727 | A1* | 9/2014 | Alaniz | B60R 1/00 |
| | | | | 348/148 |
| 2014/0278065 | A1* | 9/2014 | Ren | G06T 15/04 |
| | | | | 701/454 |
| 2014/0333729 | A1* | 11/2014 | Pflug | G06T 15/20 |
| | | | | 348/47 |
| 2015/0022664 | A1* | 1/2015 | Pflug | H04N 7/181 |
| | | | | 348/148 |
| 2015/0178922 | A1* | 6/2015 | Nakai | G06T 7/80 |
| | | | | 348/187 |
| 2015/0269733 | A1* | 9/2015 | Kosaki | G06K 9/74 |
| | | | | 382/107 |
| 2015/0317831 | A1* | 11/2015 | Ebstyne | G06T 19/006 |
| | | | | 345/419 |
| 2016/0182823 | A1 | 6/2016 | Murasumi et al. | |
| 2016/0291592 | A1* | 10/2016 | Matthews | G05D 1/0038 |
| 2017/0057414 | A1* | 3/2017 | Hayashi | B60R 1/00 |
| 2017/0169610 | A1* | 6/2017 | King | G02B 27/017 |
| 2018/0137596 | A1* | 5/2018 | Chenu | B61L 15/0027 |
| 2019/0118712 | A1* | 4/2019 | Shigemura | B60R 1/00 |
| 2019/0160971 | A1* | 5/2019 | Fukushima | B60R 21/00 |

OTHER PUBLICATIONS

IEEE Standards Association, IEEE Standard for Layer 2 Transport Protocol for Time-Sensitive Applications in Bridged Local Area Networks, IEEE Std 1722-2011, May 6, 2011, 57 pages.

IEEE Standards Association, IEEE Standard for Local and metropolitan area networks—Media Access Control (MAC) Bridges and Virtual Bridge Local Area Networks, IEEE Std. 802.1Q-2011, Aug. 31, 2011, 1,365 pages (submitted in two parts).

European Patent Office, Extended European Search Report Issued in Application No. 18166835.1, dated Sep. 18, 2018, Germany, 9 pages.

* cited by examiner

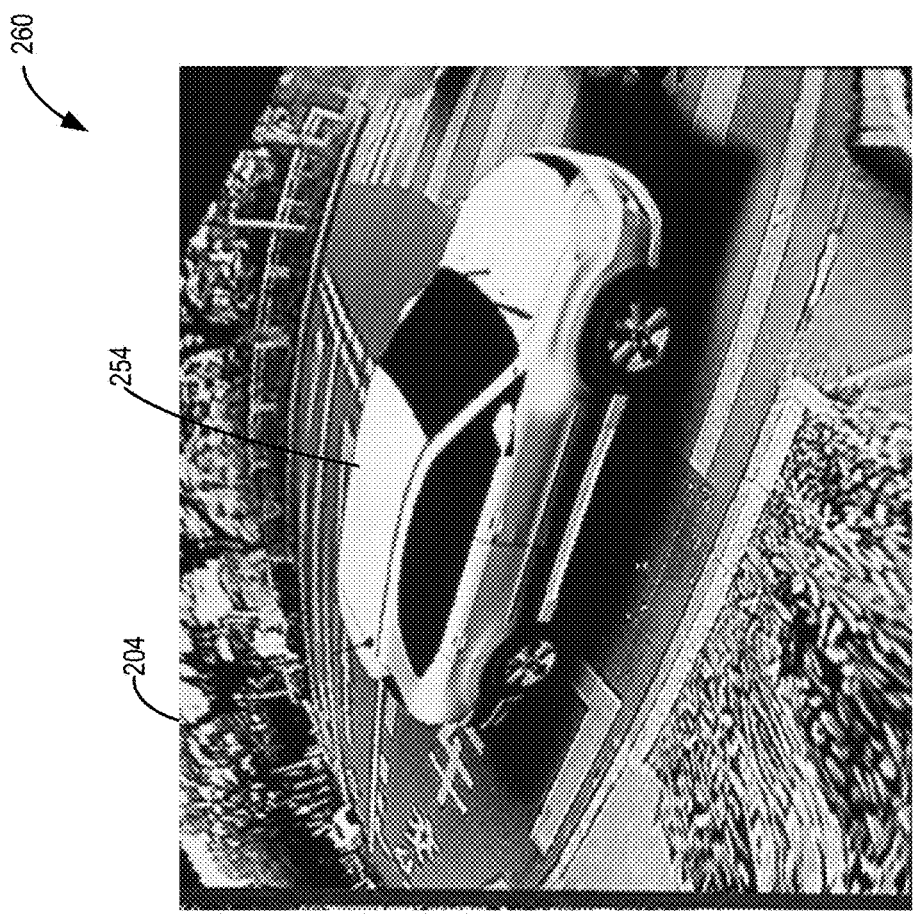
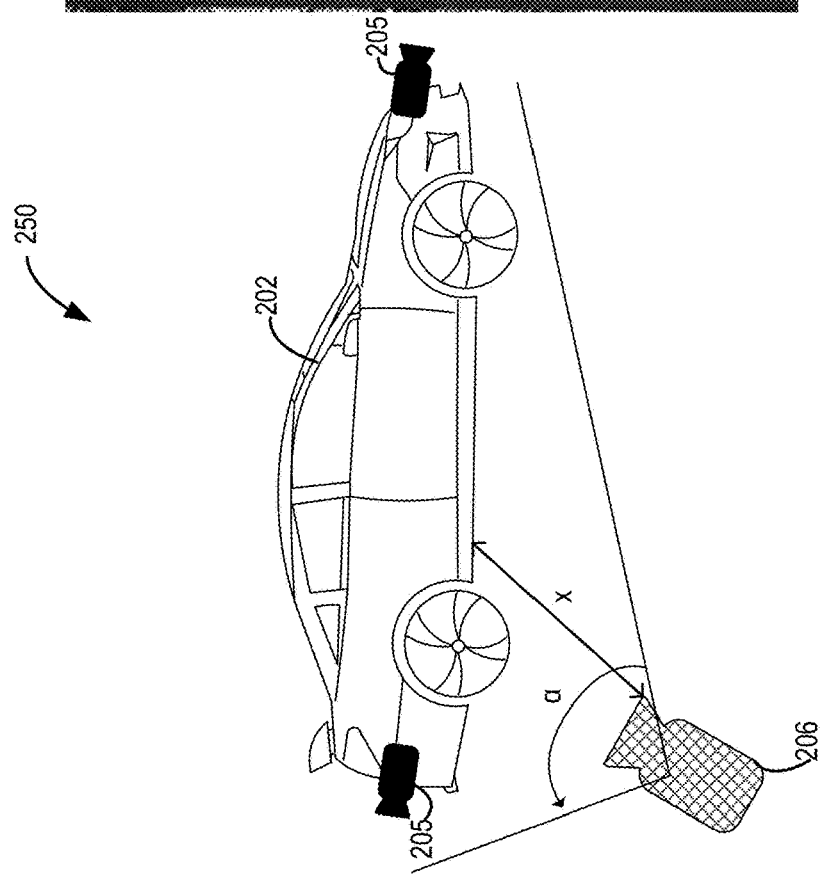
FIG. 2D
FIG. 2C

SYSTEMS AND METHODS FOR DRIVER ASSISTANCE

CROSS REFERENCE TO RELATED APPLICATIONS

The present application claims priority to U.S. Provisional Application No. 62/488,599 for "SYSTEMS AND METHODS FOR DRIVER ASSISTANCE," and filed on Apr. 21, 2017. The entire contents of the above-listed application are hereby incorporated by reference for all purposes.

FIELD

The disclosure relates to the field of driver assistance system, and in particular to driver assistance system including a virtual view system operable to generate a virtual view of a vehicle based on driving situations.

BACKGROUND

Driver assistance may include any relief that is provided to an individual associated with a vehicle with the aim of increasing individual protection and enhancing driver experience. Driver assistance systems may include surround view systems capable of generating a three-dimensional virtual view of a surrounding of the vehicle through multiple cameras that are positioned around the vehicle. Typically, the surround view systems may stitch together images from the multiple cameras and generate the surround view from a virtual camera position where the virtual camera position is coupled to the multiple physical cameras, whereby the virtual camera maintains a relative position to the physical cameras. The surround view derived from the virtual camera position may be presented to the driver. Although the term "surround" implies that a view is generated that allows viewing all around the vehicle, and typical systems may in fact provide a top-down view of the vehicle's surroundings, further enhancements on surround view systems allow the systems to create perspectives as if viewing the vehicle from a viewpoint other than top down and which do not necessarily display the entire vehicle surroundings. In such systems, however, the view created is relative to the vehicle (and the physical cameras on the vehicle) and will move with the vehicle.

SUMMARY

Providing a view from a virtual camera position is particularly useful in situations where the driver's view may be obstructed, while a surround view may not be obstructed. Overall, driver assistance systems including surround view systems may be configured to enhance a driver's spatial awareness by providing detailed information about the vehicle's environment that may not be apparent to the driver. In systems where the vehicle (or another vehicle-based position) is used as a center of reference for the display of movement (e.g., where the vehicle remains static on the screen while the surrounding environment moves), such a display may become disorienting or less useful (than other views) in some contexts. Accordingly, there may be some occasions where driver assistance is better served by maintaining the surroundings of the vehicle static while the vehicle appears to move. The disclosure provides systems and methods for decoupling a virtual camera from a physical camera so that the virtual camera appears static with regards to a reference other than the vehicle, under at least some conditions.

Embodiments are disclosed for generating virtual views that are at least partially decoupled from views of a physical camera. An example method includes capturing images from at least one physical camera, generating a virtual image of a virtual camera from the captured images of at least one physical camera, the virtual image having either a different viewpoint, a different orientation, or a different viewpoint and orientation than the images captured by at least one physical camera, and automatically maintaining the virtual position of the virtual camera, relative to a reference point, when the at least one physical camera moves relative to the reference point.

BRIEF DESCRIPTION OF THE DRAWINGS

The disclosure may be better understood from reading the following description of non-limiting embodiments, with reference to the attached drawings, wherein below:

FIGS. 2C and 2D show the schematic view of the vehicle and an example side virtual view of the vehicle respectively in accordance with one or more embodiments of the present disclosure;

DETAILED DESCRIPTION

As described above, vehicles may be configured with virtual view systems capable of generating virtual views of an environment of an object. Some examples of the object may include a car, an excavator, a helicopter, and a lift. A virtual view of an object may be generated by stitching together different perspective views of the object obtained from a plurality of physical cameras mounted to the object. Further, a virtual camera may be coupled to the plurality of physical cameras such that the virtual camera moves as the object and the plurality of cameras move. The virtual view of the object generated from the virtual camera positioned at a virtual camera position may be presented to a user of the object via a display, for example. Herein, the systems may use the object onto which the cameras are attached as the center of reference for the display of movement. Specifically, the object remains static on the screen as the surrounding environment moves in such examples. Although this arrangement may seem natural in most instances, there may be occasions where maintaining the surrounding static while the object appears to move may be more appropriate.

The present disclosure describes a system that provides an enhanced three-dimensional virtual view system which decouples the plurality of cameras from the virtual camera and further selects a virtual camera position that is most relevant to a given situation (based on inputs from user, for example). The system may also consider an operation condition of the object in this selection (e.g., object speed being below a threshold). The system may further place the decoupled, virtual camera such that the surrounding may appear to be static while the object may appear to move in the virtual view.

For example, when parallel parking a vehicle, if the virtual view is vehicle-centric (e.g., fixed with the vehicle), then as the vehicle performs the position adjustments, the driver of the vehicle may take into consideration how "the world" "moves" in order to adjust the positioning of the vehicle within the spot, rather than how the vehicle is to move to adjust to "the world".

Thus, the present disclosure describes a system that dynamically positions a virtual camera at a desired location (e.g., facing the reference object) which is "world'-centric" as opposed to positioning the virtual camera in a location that is "vehicle-centric" during certain operating conditions of the object and/or user preference. As such, the "world-centric" position may be dynamically controlled by a measurement of the displacement of the object with reference to the world, making the virtual camera appear to be static and with a "world reference". In this way, the virtual camera may be decoupled from the plurality of physical cameras mounted on the object, thereby presenting a virtual view to the user of the object that enhances the perception of motion of the object by the user.

Figure 1A:
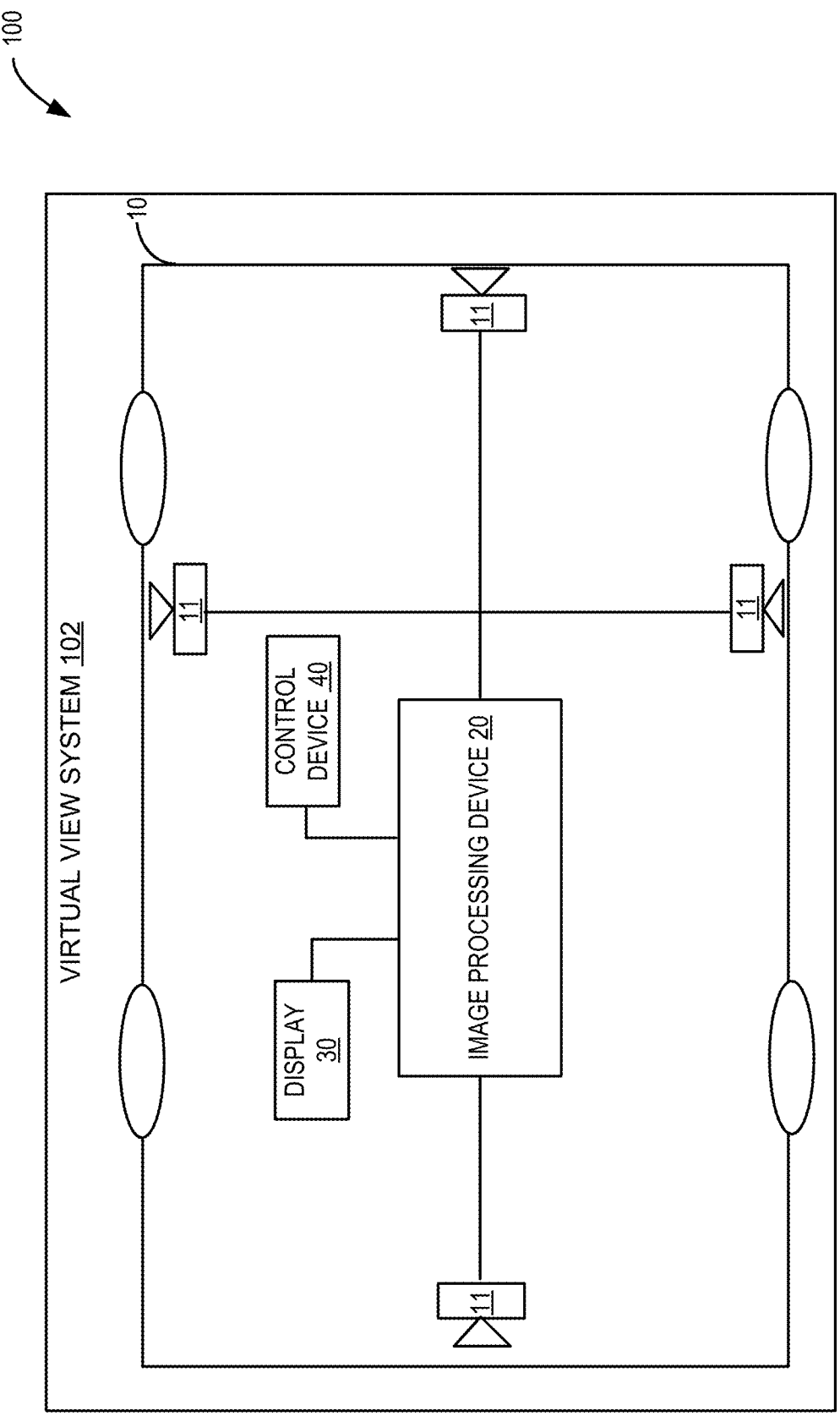
FIG. 1A shows an example virtual view system of an object capable of generating a virtual view of a surrounding of the object using image data acquired from a plurality of physical cameras mounted on the object in accordance with one or more embodiments of the present disclosure.

FIG. 1A shows a schematic view 100 of an example virtual view system 102 of an object 10. In one non-limiting example, the object may be a vehicle. The object 10 includes a plurality of image sensors 11. As a non-limiting example, four image sensors 11 are shown. The image sensors 11 may be placed symmetrically along a perimeter of the object 10 facing different directions. Together, the plurality of image sensors 11 can image a 360 degree surroundings of the vehicle 10. For example, a first image sensor 11 may be placed on the front bumper, a second and a third image sensor 11 may be positioned under each side mirror, and a fourth image sensor 11 may be placed at the rear bumper of the vehicle 10. As such, there may be sufficient overlap between regions imaged by each of the sensors 11 such that when the images from the sensors 11 are combined, a view of the entire surrounding of the object 10 may be generated. As an example, the image sensors 11 may be fish-eye cameras with ultra-wide angled lenses capable of generating wide panoramic hemispherical images. As another example, the image sensors 11 may be omni-directional cameras. As yet another example, the image sensors 11 may be wide-angle rectilinear cameras.

The virtual view system 102 may include an image processing device 20 capable of receiving the image data from the plurality of image sensors 11. For example, image data corresponding to the surrounding of the object 10 may be captured by the plurality of image sensors 11 and passed to the image processing device 20. The received image data may be analyzed and stitched together in order to generate a virtual view of the surrounding the vehicle 10 or, selectively positioned to view an area of interest that may not include the entire vehicle surrounding. Any suitable algorithms or routines and/or combination of algorithms/routines may be utilized to analyze and generate a synthesized image of the surrounding. As such, the analysis may include any post-processing that may be applied to the image data to correct and/or remove any distortions in the image data, for example.

The virtual view may be derived using a virtual camera position and using a viewing direction of the virtual camera orientation. A control device 40 may be operable to allow a user (manually) or a computer system (automatically) to change the virtual camera position, orientation, or position and orientation, and thereby change the virtual view. The virtual view system 102 includes a display 30 on which the virtual view may be displayed. The display 30 comprises any type of display capable of displaying information to the driver such as a monitor, a screen, a console, or the like. The display 30 may be a standalone display of the virtual view system 102 or may be a display of a computing system of the object, as explained later with reference to FIGS. 1B and 13. It is to be understood that the systems in reference may not all be on the vehicle, and all or some may be located remotely (e.g., in one or more cloud-based computing systems).

Figure 1B:
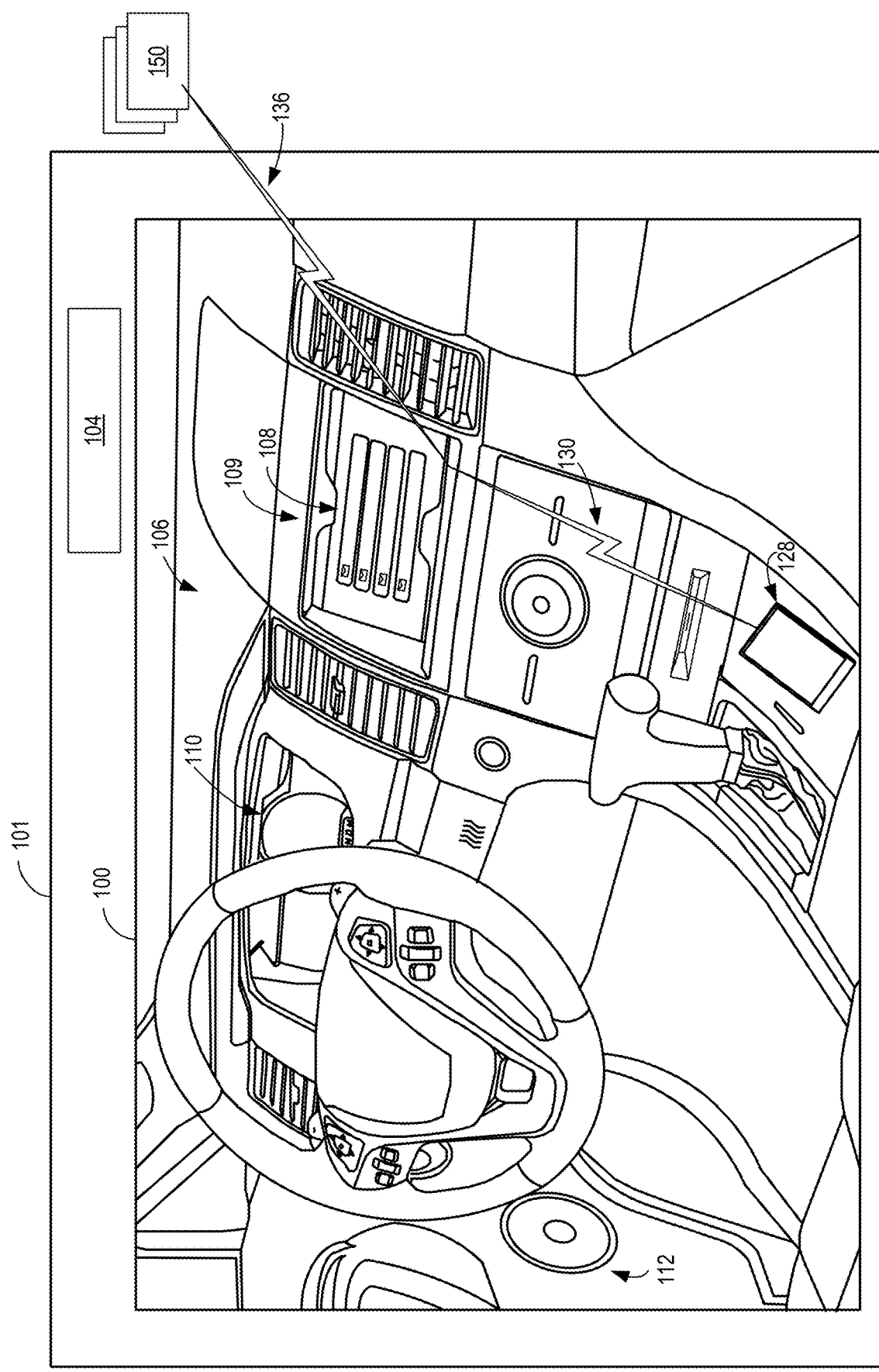
FIG. 1B shows an example partial view of a cabin of the object where the virtual view may be displayed in accordance with one or more embodiments of the present disclosure.

Turning now to FIG. 1B, it shows an example partial view of one type of environment for a communication system: an interior of a cabin 100 of a vehicle 101, in which a driver and/or one or more passengers may be seated. Vehicle 101 of FIG. 1B may be a motor vehicle including drive wheels (not shown) and may include an internal combustion engine 104. Vehicle 101 may be an automobile, an excavator, a helicopter, a lift, among other types of vehicles. Some of the features present in the interior of the cabin 100 may be described below.

As shown, an instrument panel 106 may include various displays and controls accessible to a driver (also referred to as the user) of vehicle 101. For example, instrument panel 106 may include a display 108 of an in-vehicle computing system 109 (e.g., an infotainment system), an audio system control panel, and an instrument cluster 110. The display 108 may be a non-limiting example of the display 30 of FIG. 1A. The display 108 may be a touch screen display, for example. While the example system shown in FIG. 1B includes audio system controls that may be performed via a user interface of in-vehicle computing system 109, such as display 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via display 108, or based on data regarding the user (such as a physical state and/or environment of the user) received via external devices 150 and/or mobile device 128.

In some embodiments, one or more hardware elements of in-vehicle computing system 109, such as display 108, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle. In addition, the cabin may not actually be located on the vehicle being controlled, as may occur with remote control vehicles.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128. Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 101, such as one or more external devices 150. In the depicted embodiment, external devices 150 are located outside of vehicle 101 though it will be appreciated that in alternate embodiments, external devices may be located inside cabin 100. In some embodiments, the external devices 150 may include a plurality of cameras (not shown in FIG. 1B) mounted to the vehicle 101. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136, which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as a surround and/or virtual view system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. Examples of external device 150 may include one or more Lidar systems, ultrasonic sensors, radar systems, and/or other range-sensing systems that may be used by the vehicle and/or cameras to determine a relative position of the vehicle and/or cameras with respect to the world/environment and calculate and counter the vehicle movement in order to show a static view. Additional or alternative internal sensors may be used for the above-described purpose, including inertial measurement unit(s) (IMU), gyroscopes, accelerometers, and high accuracy Global Navigation Satellite Systems (GNSS).

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1B, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may additionally or alternatively be used.

It is to be understood that FIGS. 1A and 1B depict example environments, however the communication systems and methods described herein may be utilized in any suitable environment. Any suitable devices that transmit and/or receive information, sense data, and/or otherwise contribute to a driver distraction detection and/or alert system may be utilized as the systems and/or to perform the methods described herein.

It is to be understood that, without departing from the scope of this disclosure, systems that perform the described virtual view generation may not include all sensors indicated above. For example, a system may include the physical cameras to capture the scene of interest, a device or devices to establish a reference point for movement of the physical cameras, and a processing unit or units to compute the virtual image output of the virtual camera.

Figure 13:
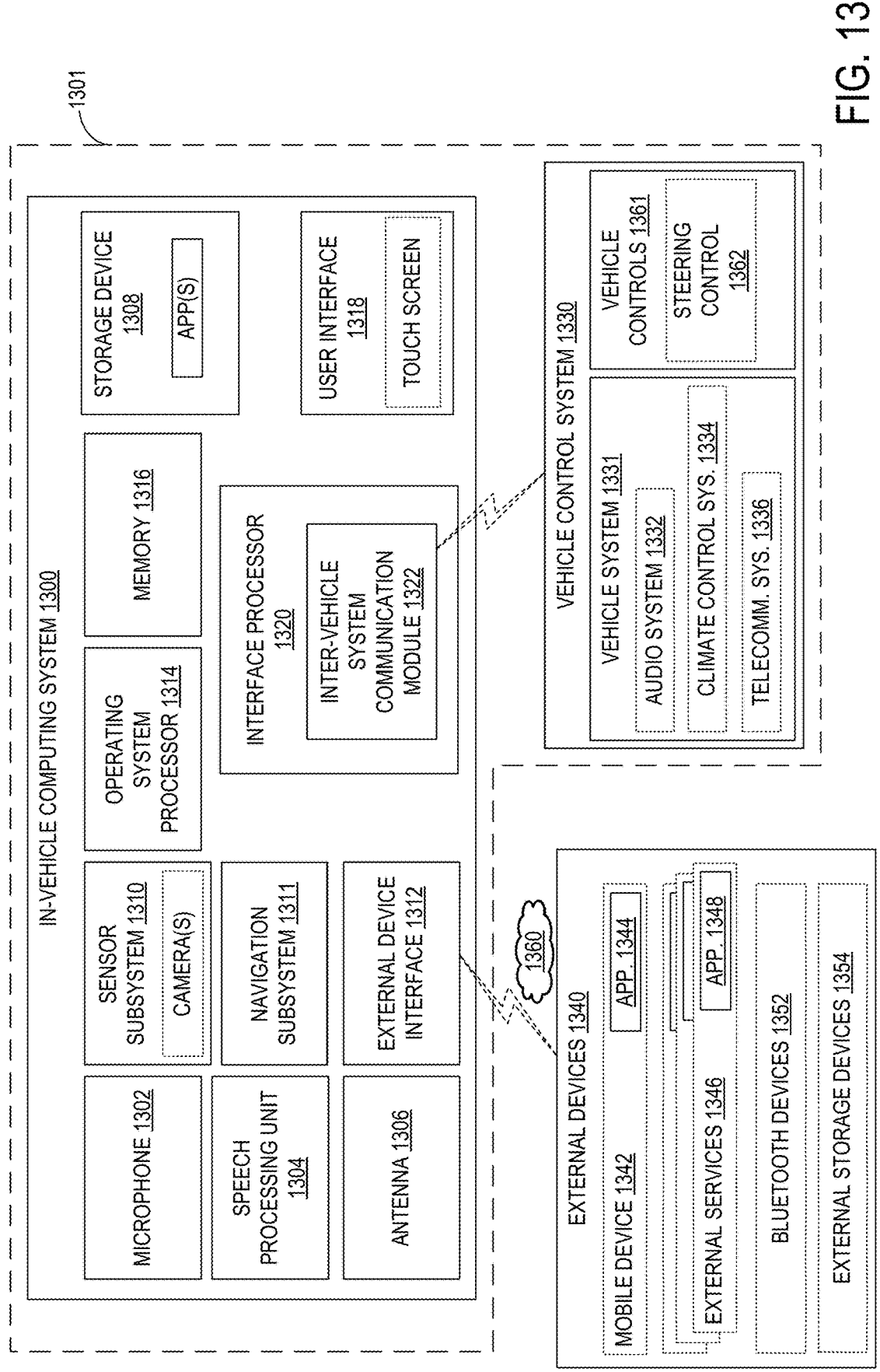
FIG. 13 shows an example in-vehicle computing system of the vehicle in accordance with one or more embodiments of the present disclosure.

FIG. 13 shows a block diagram of an in-vehicle computing system 1300 configured and/or integrated inside vehicle 1301. In-vehicle computing system 1300 may be an example of in-vehicle computing system 109 of FIG. 1B and/or may perform one or more of the methods described herein in some embodiments. Some additional features of the in-vehicle computing system 1300 are described below.

In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, subsystems, hardware components, as well as software applications and systems that are integrated in, or integratable into, vehicle 1301 in order to enhance an in-vehicle experience for a driver and/or a passenger.

In-vehicle computing system 1300 may include one or more processors including an operating system processor 1314 and an interface processor 1320. Operating system processor 1314 may execute an operating system on the in-vehicle computing system, and control input/output, display, playback, and other operations of the in-vehicle computing system. Interface processor 1320 may interface with a vehicle control system 1330 via an inter-vehicle system communication module 1322.

Inter-vehicle system communication module 1322 may output data to other vehicle systems 1331 and vehicle control elements 1361, while also receiving data input from other vehicle components and systems 1331, 1361, e.g. by way of vehicle control system 1330. When outputting data, inter-vehicle system communication module 1322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 1308 may be included in in-vehicle computing system 1300 to store data such as instructions executable by processors 1314 and 1320 in non-volatile form. The storage device 1308 may store application data to enable the in-vehicle computing system 1300 to run an application for connecting to a cloud-based server and/or collecting information for transmission to the cloud-based server. The application may retrieve information gathered by vehicle systems/sensors, input devices (e.g., user interface 1318), devices in communication with the in-vehicle computing system (e.g., a mobile device connected via a Bluetooth link), etc. In-vehicle computing system 1300 may further include a volatile memory 1316. Volatile memory 1316 may be random access memory (RAM). Non-transitory storage devices, such as non-volatile storage device 1308 and/or volatile memory 1316, may store instructions and/or code that, when executed by a processor (e.g., operating system processor 1314 and/or interface processor 1320), controls the in-vehicle computing system 1300 to perform one or more of the actions described in the disclosure.

A microphone 1302 may be included in the in-vehicle computing system 1300 to receive voice commands from a user, to measure ambient noise in the vehicle, to determine whether audio from speakers of the vehicle is tuned in accordance with an acoustic environment of the vehicle, etc. A speech processing unit 1304 may process voice commands, such as the voice commands received from the microphone 1302. In some embodiments, in-vehicle computing system 1300 may also be able to receive voice commands and sample ambient vehicle noise using a microphone included in an audio system 1332 of the vehicle.

One or more additional sensors may be included in a sensor subsystem 1310 of the in-vehicle computing system 1300. For example, the sensor subsystem 1310 may include a camera, such as a rear view camera for assisting a user in parking the vehicle and/or a cabin camera for identifying a user (e.g., using facial recognition and/or user gestures). Sensor subsystem 1310 of in-vehicle computing system 1300 may communicate with and receive inputs from various vehicle sensors and may further receive user inputs. For example, the inputs received by sensor subsystem 1310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 1310 alone, other sensors may communicate with both sensor subsystem 1310 and vehicle control system 1330, or may communicate with sensor subsystem 1310 indirectly via vehicle control system 1330. A navigation subsystem 1311 of in-vehicle computing system 1300 may generate and/or receive navigation information such as location information (e.g., via a GPS sensor and/or other sensors from sensor subsystem 1310), route guidance, traffic information, point-of-interest (POI) identification, and/or provide other navigational services for the driver.

External device interface 1312 of in-vehicle computing system 1300 may be coupleable to and/or communicate with one or more external devices 1340 located external to vehicle 1301. While the external devices are illustrated as being located external to vehicle 1301, it is to be understood that they may be temporarily housed in vehicle 1301, such as when the user is operating the external devices while operating vehicle 1301. In other words, the external devices 1340 are not integral to vehicle 1301. The external devices 1340 may include a mobile device 1342 (e.g., connected via a Bluetooth connection) or an alternate Bluetooth-enabled device 1352. Mobile device 1342 may be a mobile phone, smart phone, wearable devices/sensors that may communicate with the in-vehicle computing system via wired and/or wireless communication, or other portable electronic device(s). Other external devices include external services 1346. For example, the external devices may include extra-vehicular devices that are separate from and located externally to the vehicle. Still other external devices include external storage devices 1354, such as solid-state drives, pen drives, USB drives, etc. External devices 1340 may communicate with in-vehicle computing system 1300 either wirelessly or via connectors without departing from the scope of this disclosure. For example, external devices 1340 may communicate with in-vehicle computing system 1300 through the external device interface 1312 over network 1360, a universal serial bus (USB) connection, a direct wired connection, a direct wireless connection, and/or other communication link. The external device interface 1312 may provide a communication interface to enable the in-vehicle computing system to communicate with mobile devices associated with contacts of the driver. For example, the external device interface 1312 may enable phone calls to be established and/or text messages (e.g., SMS, MMS, etc.) to be sent (e.g., via a cellular communications network) to a mobile device associated with a contact of the driver.

One or more applications 1344 may be operable on mobile device 1342. As an example, mobile device application 1344 may be operated to aggregate user data regarding interactions of the user with the mobile device. For example, mobile device application 1344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 1344 to external device interface 1312 over network 1360. In addition, specific user data requests may be received at mobile device 1342 from in-vehicle computing system 1300 via the external device interface 1312. The specific data requests may include requests for determining where the user is geographically located, an ambient noise level and/or music genre at the user's location, an ambient weather condition (temperature, humidity, etc.) at the user's location, etc. Mobile device application 1344 may send control instructions to components (e.g., microphone, etc.) or other applications (e.g., navigational applications) of mobile device 1342 to enable the requested data to be collected on the mobile device. Mobile device application 1344 may then relay the collected information back to in-vehicle computing system 1300.

Likewise, one or more applications 1348 may be operable on external services 1346. As an example, external services applications 1348 may be operated to aggregate and/or analyze data from multiple data sources. For example, external services applications 1348 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 1330 may include controls for controlling aspects of various vehicle systems 1331 involved in different in-vehicle functions. These may include, for example, controlling aspects of vehicle audio system 1332 for providing audio entertainment to the vehicle occupants, aspects of climate control system 1334 for meeting the cabin cooling or heating needs of the vehicle occupants, as well as aspects of telecommunication system 1336 for enabling vehicle occupants to establish telecommunication linkage with others.

Audio system 1332 may include one or more acoustic reproduction devices including electromagnetic transducers such as speakers. Vehicle audio system 1332 may be passive or active such as by including a power amplifier. In some examples, in-vehicle computing system 1300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 1334 may be configured to provide a comfortable environment within the cabin or passenger compartment of vehicle 1301. Climate control system 1334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 1330 may also include controls for adjusting the settings of various vehicle controls 1361 (or vehicle system control elements) related to the engine and/or auxiliary elements within a cabin of the vehicle, such as steering wheel controls 1362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc.

In one example, a virtual camera may be decoupled from the sensors of the sensor subsystem 1310 in order to generate a decoupled virtual view. In order to decouple the virtual camera from the plurality of physical cameras mounted to the vehicle, the system may counter compensate for the movement of the vehicle. For example, the decoupled virtual camera position may be adjusted based on an amount by which a steering wheel of the vehicle is turned and/or an amount by which wheels of the vehicle are rotated which is determined based on the steering control output.

Vehicle controls 1361 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 1332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 1334. For example, the control signals may increase delivery of cooled air to a specific section of the cabin.

Control elements positioned on an outside of a vehicle (e.g., controls for a security system) may also be connected to computing system 1300, such as via communication module 1322. The control elements of the vehicle control system may be physically and permanently positioned on and/or in the vehicle for receiving user input. In addition to receiving control instructions from in-vehicle computing system 1300, vehicle control system 1330 may also receive input from one or more external devices 1340 operated by the user, such as from mobile device 1342. This allows aspects of vehicle systems 1331 and vehicle controls 1361 to be controlled based on user input received from the external devices 1340.

In-vehicle computing system 1300 may further include an antenna 1306. Antenna 1306 is shown as a single antenna, but may comprise one or more antennas in some embodiments. The in-vehicle computing system may obtain broadband wireless internet access via antenna 1306, and may further receive broadcast signals such as radio, television, weather, traffic, and the like. The in-vehicle computing system may receive positioning signals such as GPS signals via one or more antennas 1306. The in-vehicle computing system may also receive wireless commands via RF such as via antenna(s) 1306 or via infrared or other means through appropriate receiving devices. In some embodiments, antenna 1306 may be included as part of audio system 1332 or telecommunication system 1336. Additionally, antenna 1306 may provide AM/FM radio signals to external devices 1340 (such as to mobile device 1342) via external device interface 1312.

One or more elements of the in-vehicle computing system 1300 may be controlled by a user via user interface 1318. User interface 1318 may include a graphical user interface presented on a touch screen, such as touch screen 108 of FIG. 1B, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 1300 and mobile device 1342 via user interface 1318. In addition to receiving a user's vehicle setting preferences on user interface 1318, vehicle settings selected by in-vehicle control system may be displayed to a user on user interface 1318. Notifications and other messages (e.g., received messages), as well as navigational assistance, may be displayed to the user on a display of the user interface. User preferences/information and/or responses to presented messages may be performed via user input to the user interface.

Returning to FIG. 1A, the virtual view system 102 may generate a virtual view based on image data received from the plurality of image sensors 11 and display the virtual view on the display 30. As discussed with reference to FIG. 1B, the display may be a display of a vehicle such as display 108 of the vehicle 101. In other examples, the display may be another display integrated or positioned in the vehicle (e.g., a seat-back display, a head-up display integrated in a windshield, a display of a mobile device in the cabin of the vehicle, etc.) and/or a display remote from the vehicle (e.g., an external display positioned outside of the vehicle and spaced apart from the vehicle, such as a display of a remote connected device). It is to be understood that the display of information described herein may refer to display of the information on any one or combination of the above example displays and/or any other suitable display. In some examples, the virtual view system 102 may be integrated with an in-vehicle computing system (such as in-vehicle system 109 of FIG. 1B and/or in-vehicle computing system 1300 of FIG. 13) of the vehicle 101. The virtual view may include a view that is mathematically generated using image data that is acquired using the image sensors mounted on the vehicle 101, as described in FIGS. 2A-2D.

Figure 2B:
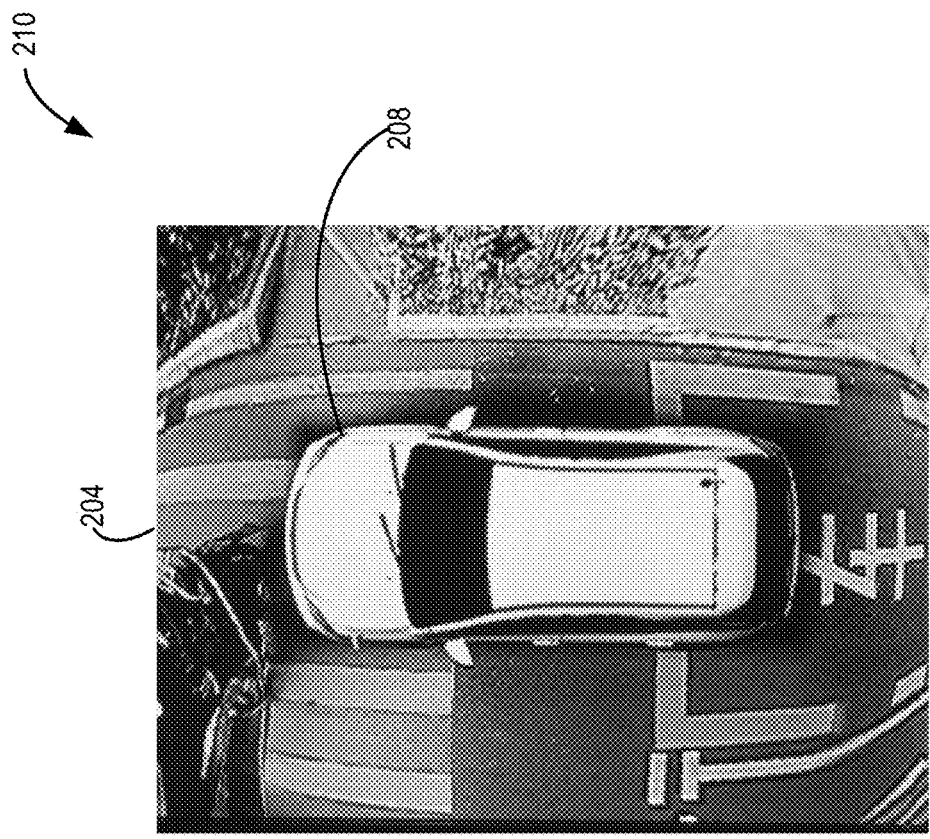
FIGS. 2A and 2B show a schematic view of a vehicle and an example top-down virtual view of the vehicle respectively in accordance with one or more embodiments of the present disclosure.
Figure 2A:
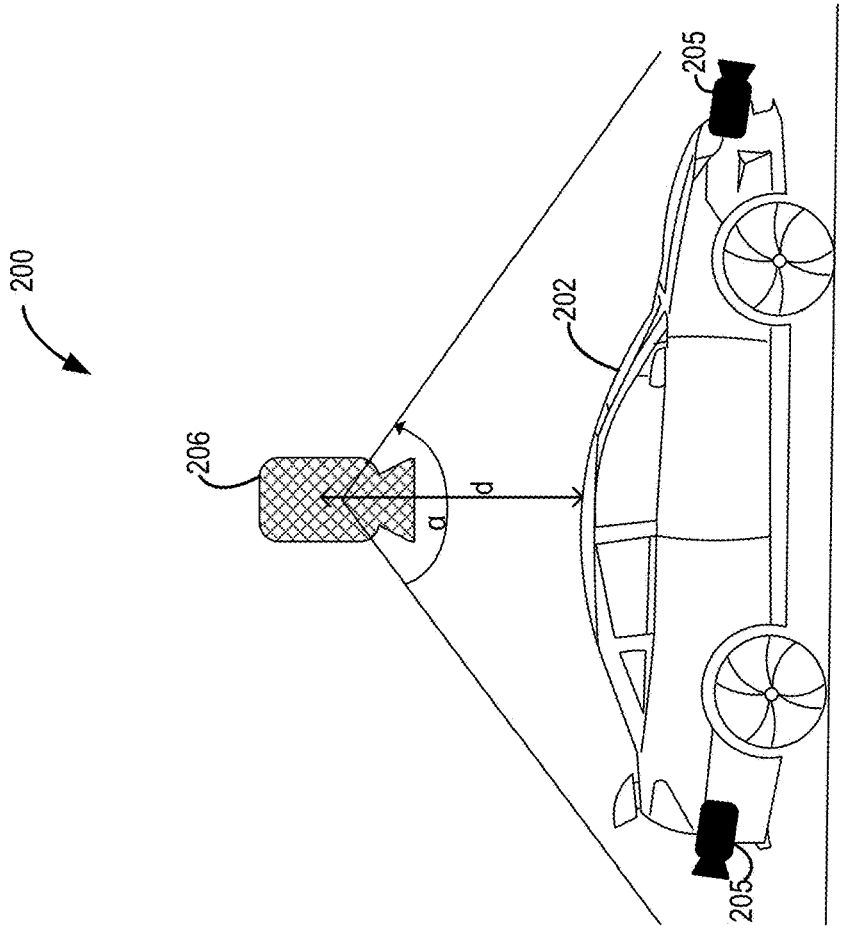

FIGS. 2A and 2B may be explained together. FIG. 2A shows a schematic view 200 of a vehicle 202 and FIG. 2B shows a top-down virtual view 210 of the vehicle 202 that is displayed on a display 204 of the vehicle 202. A plurality of cameras 205 are mounted on the vehicle 202. Two cameras, one mounted to the front of the vehicle and the other mounted to the rear of the vehicle are shown in FIG. 2A for illustrative purposes only. Additional cameras may be mounted to the vehicle 202 (e.g., to the sides of the vehicle). Image data from the plurality of cameras 205 may be analyzed and a virtual view of the vehicle 202 may be generated as shown in FIG. 2B. In a first example, the virtual view of the vehicle may be generated by a virtual view system such as the system 102 of FIG. 1A and displayed on a display such as display 30 of FIG. 1A. In a second example, the virtual view may be generated by an in-vehicle computing system (such as an in-vehicle computing system 109 of FIG. 1B and/or in-vehicle computing system 1300 shown in FIG. 13 described further below) and displayed to a driver of the vehicle using a display of the in-vehicle computing system.

The top-down virtual view 210 of the vehicle 202 may be mathematically generated using image data acquired by the plurality of cameras 205. The top-down virtual view 210 of the vehicle 202 may be generated by placing a virtual camera 206 at a distance d from the top of the vehicle 202. As such, the top-down virtual view 210 may include an image 208 of the vehicle 202. In some examples, the image 208 may be a model of a vehicle that is pre-generated and stored in the system. When a virtual view is generated, the system may use the model image 208 in place of the actual vehicle 202. In addition, the system may adjust the pixels from the cameras (e.g., rotate, reshape, recolor and relocate, usually through a mathematical or geometrical conversion, which may have one pixel converted to many or many converted to one) so that the top-down virtual view 210 appears to have been generated using a camera at distance d from the top of the vehicle 202. As such, a viewing angle α may be adjusted to change the top-down virtual view 210.

Turning now to FIGS. 2C and 2D, another virtual view of the vehicle 202 is shown. FIG. 2D shows a virtual view 260 of the vehicle 202 displayed in the display 204 of vehicle 202. As described previously, the virtual view 260 is generated using image data acquired from either a set of or the totality of the plurality of cameras mounted on the vehicle 202. Herein, the virtual camera 206 is positioned along a side of a vehicle at a distance x from the vehicle 202 as shown in FIG. 2C. The virtual view 260 includes an image 254 of the vehicle 202. The pixels in the virtual view 260 leading up the image 254 may be generated by receiving image data from the plurality of cameras and selectively drawing the pixels backwards, with the additional conversions, to achieve a virtual view which appears to start at a point away from the vehicle. In this way, a three-dimensional surround or virtual view of the vehicle's physical environment may be generated (the vehicle 202 itself may be a 3D model that is rendered into the image).

Typically, virtual view systems use the vehicle onto which the cameras are attached as the center of reference for the display of movement. Specifically, the vehicle remains static on the display while the surrounding environment moves. Although this arrangement may seem natural in many instances, there are occasions where maintaining the surrounding static while the vehicle appears to move may be more appropriate. For example, when parallel parking a vehicle, if the virtual view is vehicle-centric, then as the vehicle performs the position adjustments, the driver may consider how "the world" is to "move" to adjust to the car's positioning within the spot, rather than how the car is to move to adjust to "the world", which may be more natural.

Thus, it may be possible to decouple the virtual camera from the plurality of physical cameras that are mounted on the vehicle in order to generate a virtual view that may remain static with the world. In order to decouple the virtual camera from the plurality of physical cameras mounted to the vehicle, the system may counter compensate for the movement of the vehicle. In this way, a world-locked virtual view may be generated in which the virtual view may remain static while the vehicle continues to move. The advantages of having such a world-locked virtual view is explained with some example scenarios in FIGS. 6-11. In addition, example methods for performing such decoupling and additionally switching from the world-locked view to vehicle-locked view and vice versa are illustrated in FIGS. 3-5 and 12.

Figure 3:
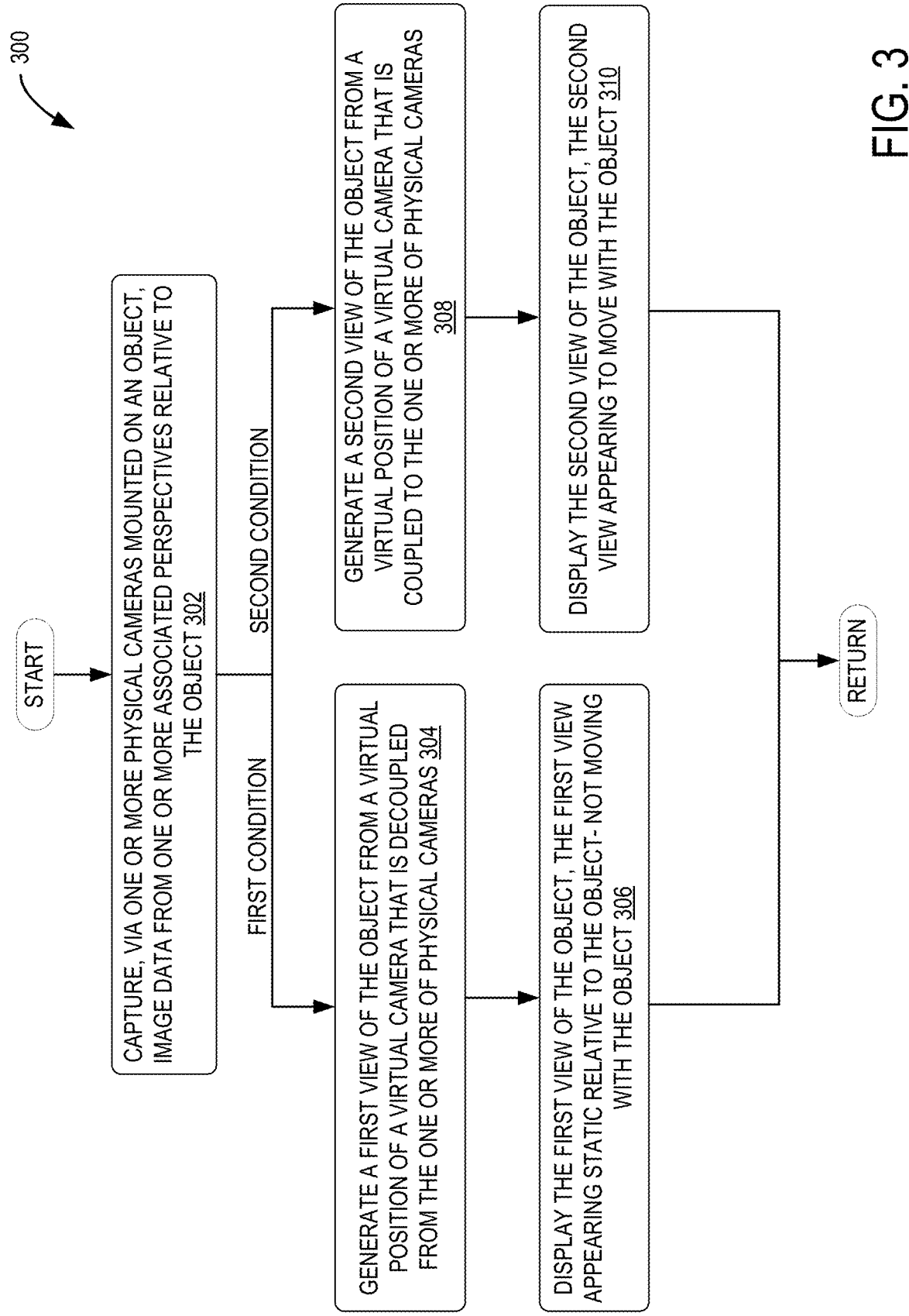
FIG. 3 shows a flow chart of an example method for generating one of two views: a first view that appears static relative to the object and a second view that appears to move with the object, one of which is selected based on a condition that is detected in accordance with one or more embodiments of the present disclosure.

Turning now to FIG. 3, an example method 300 for generating one of two virtual views of an object is shown. For example, method 300 may be performed by the virtual view system 102 of FIG. 1A and/or the in-vehicle computing system 109 of FIG. 1B and/or in-vehicle computing system 1300 of FIG. 13. Specifically, method 300 includes generating a first view of the object during a first condition and further includes generating a second view of the object during a second condition. In one non-limiting example, the object may include a vehicle on which one or more of physical cameras are mounted.

Method 300 begins at 302 where method includes capturing via the one or more physical cameras, image data from one or more associated perspectives relative to the object. As described earlier, the one or more physical cameras that are mounted on the object may be able to generate different perspective views. For example, a camera mounted to the front of the object may be able to generate images of the front of the vehicle, while a camera mounted to the rear of the object may be able to generate images of the rear of the vehicle which offers a different perspective when compared with what the front camera generates. Likewise, a camera mounted to a right side of the object may generate images that have different perspective when compared to images generated from a camera mounted to a left side, front, and rear of the object. By combining different perspectives relative to the object, a surround view of the object may be generated. As such, the surround view may be one of a first virtual view which is world-centric or decoupled from the one or more cameras, or a second virtual view that is vehicle-centric or coupled to the one or more cameras. Method 300 generates either the first view or the second view based on a condition.

Method 300 may determine that the first condition is encountered when a user input is received. Further, method 300 may determine that the second condition is encountered when no user input received. In some examples, the method may automatically determine that the first condition is encountered when the object or vehicle is being moved into a space and/or being parked. For example, when a reverse gear of a vehicle is activated, the method may automatically determine that the first condition is encountered. In some more examples, if a speed of the object is below a threshold speed, the method may determine that the first condition is encountered. In still more examples, if there are items/things/objects (e.g., curb, bumper of a front vehicle) or people (e.g., pedestrians crossing the road on which the vehicle is travelling) in the vicinity of the object, the method may determine that the first condition is encountered. Upon determining that the first condition is encountered, method 300 proceeds to 304 to generate the first view.

At 304, method includes generating the first view of the object from a virtual position of a virtual camera that is decoupled from the one or more physical cameras. The first view may be interchangeably referred to as a decoupled virtual view, a world-locked virtual view, and a world-centric virtual view. By decoupling the virtual camera from the one or more physical cameras, the first virtual view of the object that is generated may be static relative to a reference point other than the object. Specifically, the first view may not move with the object. Thus, during the first condition, the method may include maintaining the virtual position of the virtual camera even when the movable object or components of the movable object moves. The first view of the object is then displayed on a display to a user of the object at 306. Method 300 returns.

However, if a user input is not received, or the object speed is higher than the threshold speed, or items/objects/things are not encountered in the vicinity of the object, then method automatically determines that the second condition is encountered and accordingly method 300 proceeds to 308 where a second view of the object is generated. The above are example conditions, and it is to be understood that the conditions herein described may be replaced by other conditions that may benefit from an alternating coupled and decoupled views. In some examples, the method may switch from the first view to the second view when the condition changes from the first to the second condition and vice versa. The system may also switch views to the object-centric view if the system determines that insufficient image information is present to present a decoupled view, or shortly before the information becomes insufficient.

At 308, method 300 includes generating the second virtual view of the object from a virtual position of a virtual camera that is coupled to the one or more physical cameras. The second view may be interchangeably referred to as a coupled virtual view, object-centric virtual view, and for implementations where the object is a vehicle, a vehicle-locked virtual view. By coupling the virtual camera to the one or more physical cameras, the second virtual view of the object that is generated may move with the object. Thus, during the second condition, method 300 may include moving the virtual position of the virtual camera in coordination with movement of the movable object or components of the movable object. The second view of the object generated at the virtual position of the virtual camera may then be displayed on the display to the user of the object at 306. Method 300 returns.

Consider an example where the object is a vehicle. A user or driver of the vehicle may provide a user input via a user interface, to select one of two views; the views including a decoupled virtual view or a coupled virtual view. In some examples, the user may be able to switch/toggle between the two views. In some more examples, the user may prefer one of the views over the other, and may further lock the preferred view. For example, when parking the vehicle in a parking spot, the user may prefer to always have the "decoupled view" and accordingly, whenever the vehicle is being parked (e.g., reverse gear is activated in the vehicle), the method may automatically determine that the first condition is encountered and accordingly select the decoupled virtual view and lock the decoupled view. The decoupled virtual view may be continued to be displayed to the user until a different driving condition of the vehicle is encountered. For example, the method may lock the decoupled virtual view until a vehicle speed reaches a threshold speed (e.g., 5 mph), indicating that the vehicle is no longer being parked or that a given distance has been traveled. In some examples, the user may not wish to switch to the coupled view until the vehicle is out of the parking garage (where speed is 10 mph, for example), in which case, the decoupled view may be continued to be displayed until speed reaches 10 mph, for example. Thereafter, the view may be switched from the decoupled virtual view to the coupled virtual view. In some examples, when speed reaches 10 mph, the method may not display any virtual views, unless the user specifically requests for the coupled view, in which case the coupled view may be displayed. In some cases, the physical cameras may not be able to capture sufficient image information to create a decoupled virtual camera prior to reaching the threshold speed (e.g., 10 mph of this example). In such cases the virtual camera may perform a "jump" in the decoupled virtual camera location, whereby following the vehicle and yet remaining decoupled by portions of travel.

Thus, the virtual view displayed may be automatically selected based on one or more of the user input, detection of things in the vicinity of the object, and the movement of the object. In some examples, the position of the virtual camera may be automatically selected and/or adjusted based on one or more of the user input, detection of things in the vicinity of the object, and the movement of the object, as shown in FIG. 4.

Figure 4:
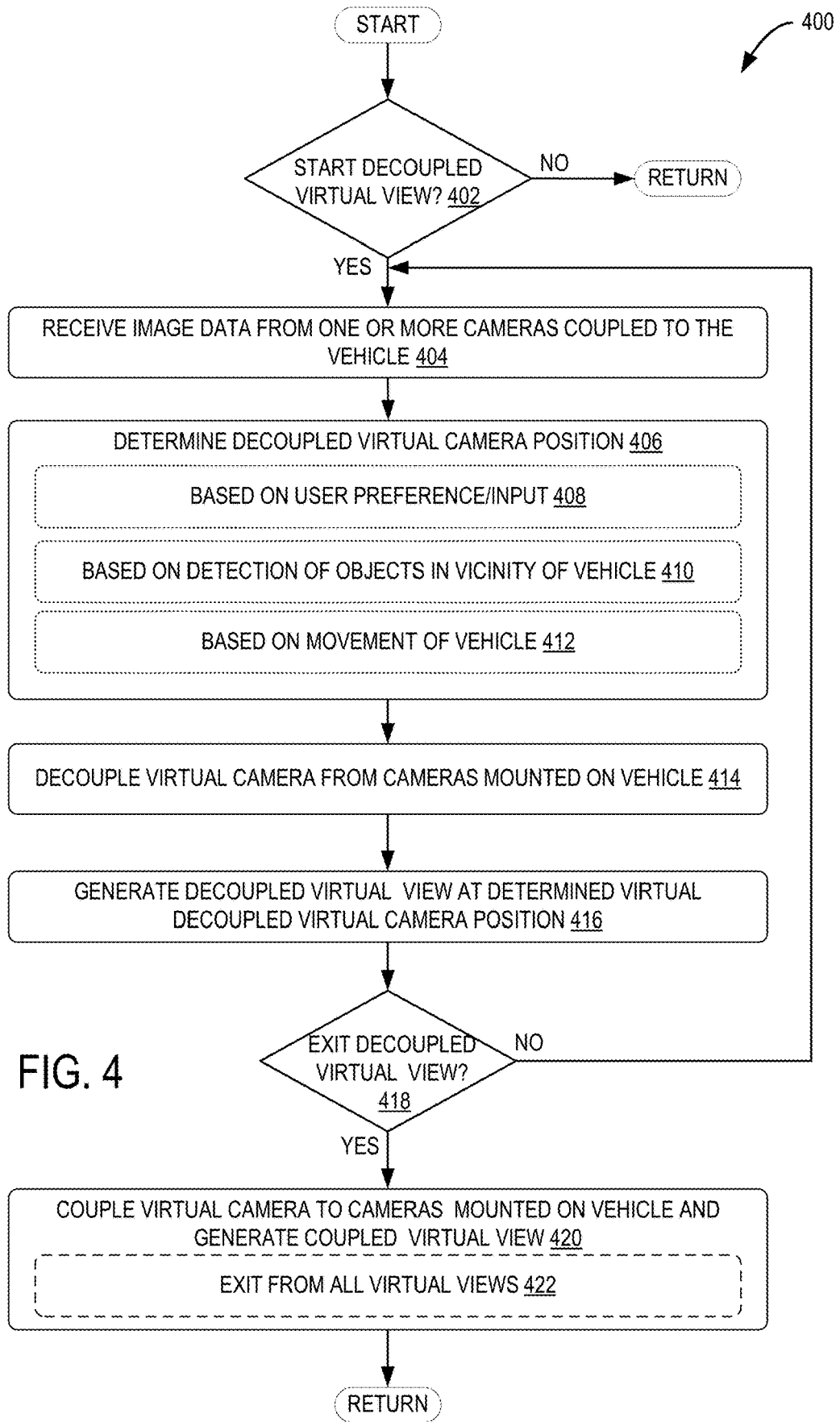
FIG. 4 shows a flow chart of an example method for determining a decoupled virtual camera position based on one or more of a user input, a detection of articles/things/people in the vicinity of the object, and based on a motion of the object in accordance with one or more embodiments of the present disclosure.

Turning now to FIG. 4, an example method 400 for generating a decoupled virtual view of a vehicle and additionally adjusting a position of a virtual camera is shown. Specifically, method 400 includes generating the decoupled virtual view based on image data received from multiple cameras mounted on the vehicle, and further includes adjusting the position of the virtual camera based on one or more of a user input, detection of objects in the vicinity of the vehicle, and a movement of the vehicle.

Method 400 begins at 402, where method includes determining if a decoupled virtual view is initiated. As described previously, the decoupled virtual view may be initiated by a user, by clicking a button, for example, or may be automatically initiated when a vehicle speed falls below a threshold, and/or when vehicle is being parked, and/or when objects are detected in the vicinity of the vehicle, as described previously with reference to FIG. 3.

If the decoupled virtual view is initiated (e.g., "YES" at 402), then method 400 proceeds to 404, else if the decoupled virtual view is not initiated, the method returns. At 404, method 400 includes receiving image data from one or more cameras coupled to the vehicle. The one or more cameras coupled the vehicle may image different areas surrounding the vehicle. Together, the one or more cameras may be able to generate a surround view or virtual view of the vehicle. Once the image data is received, method 400 proceeds to 406, where a decoupled virtual camera position is determined.

The decoupled virtual camera position may be determined based on a user preference or user input at 408. For example, when parking a vehicle inside a parking garage where there is a column (e.g., a bollard, pylon, or other structure) near a desired parking spot, the user of the vehicle may prefer to position the decoupled virtual camera on the column and pointing towards the rear of the vehicle. By positioning the virtual camera on the column, the user may be able to effectively maneuver the vehicle without bumping into the column, for example. In some examples, the user may position the virtual camera at a fixed distance and/or angle from the column and a neighboring vehicle, making the column and the neighboring vehicle both appear fixed in the world (as explained further below with reference to FIGS. 6-7). Thus, the user may be able to effectively maneuver the vehicle into the desired spot without bumping into either the column or the neighboring vehicle. In other examples, the user may adjust an orientation of the virtual camera to adjust the viewing angle of the virtual view.

Additionally, the decoupled virtual camera position may be determined based on detection of objects in the vicinity of the vehicle at 410. Based on the output of one or more position sensors and image sensors, the method may detect objects in the vicinity of the vehicle. For example, based on image data from cameras mounted on the vehicle, the method may detect a curb ahead where the turn radius is narrow. Upon detecting the curb, the method may include automatically positioning the virtual camera so as to view the curb, so that the user may be able to maneuver the turn without climbing over or hitting the curb, for example.

The decoupled virtual camera position may also be determined based on the movement of the vehicle at 412. For example, the decoupled virtual camera position may be adjusted based on an amount by which a steering wheel of the vehicle is turned and/or an amount by which wheels of the vehicle are rotated. One or more sensors and/or sensing systems may be used to assist in determining the amount and type of adjustment of the virtual camera position, such as Lidar systems, radar systems, ultrasonic sensors, and/or other range-sensing systems that may be used by the vehicle and/or cameras to determine a relative position of the vehicle and/or cameras with respect to the world/environment and calculate and counter the vehicle movement in order to show a static view. Additional or alternative internal sensors may be used for the above-described purpose, including inertial measurement unit(s) (IMU), gyroscopes, accelerometers, and high accuracy Global Navigation Satellite Systems (GNSS).

Next, at 414, method 400 includes decoupling the virtual camera from the cameras mounted on the vehicle. In some examples, the camera position may be determined by counter compensating for a movement of the vehicle. For example, if the vehicle moves to the right and/or moves a threshold amount to the right, the image generated by all coupled physical cameras involved in the current view will also move by the threshold amount. The virtual camera may then be moved by the threshold amount (or the amount that the vehicle moved to the right), but in the opposite direction so as to cancel the movement of the vehicle. In this way, the virtual camera may be effectively disconnected or decoupled from the vehicle and the cameras mounted on the vehicle.

At 416, method 400 includes generating the decoupled virtual view at the virtual camera position determined at 414. Thus, the decoupled virtual view may be a word-centric virtual view making the virtual camera appear to be static and with a "world reference". In this way, the virtual camera may be decoupled from the plurality of physical cameras mounted on the object, thereby presenting a virtual view to the user of the object that enhances the perception of motion of the object by the user.

At 418, method 400 includes determining if an exit from the decoupled virtual view is initiated. If the exit is not initiated (e.g., "NO" at 418), method 400 includes returning to 404 to capture new/updated image data and continue to generate a decoupled virtual view at the virtual camera position determined at 414.

If the exit from decoupled virtual view is initiated (e.g., "YES" at 418), then method 400 proceeds to 420. In one example, the user may prefer to exit out the decoupled virtual view. In such an example, if the user initiates the exit, then method 400 proceeds to 420. In another example, when the speed of the vehicle reaches a threshold speed (e.g., 45 mph), then the method may determine that the exit from the decoupled virtual view is initiated and accordingly proceed to 420. In yet another example, if no objects are detected in the vicinity of the vehicle (e.g., vehicle travelling on a deserted stretch of road with no other vehicles or objects in sight), then the method may determine that the exit from the decoupled virtual view is initiated and proceed to 420.

At 420, method 400 includes coupling the virtual camera to the cameras mounted on the vehicle to generate the coupled virtual view. Optionally, method 400 may include exiting from all virtual views at 422. Method 400 returns.

Figure 5:
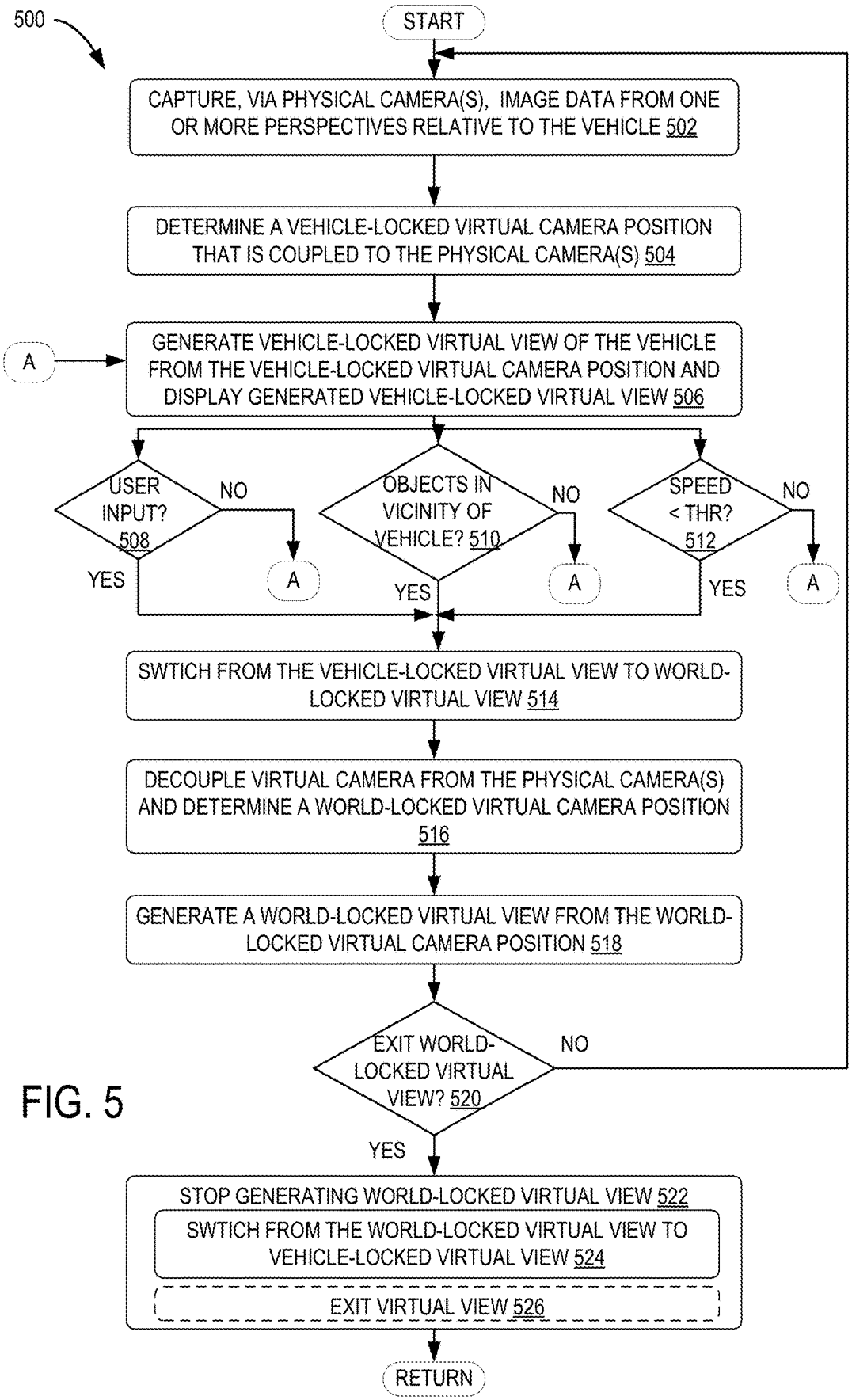
FIG. 5 shows a flow chart of an example method for switching from a vehicle-locked virtual view to a world-locked virtual view based on detecting a trigger in accordance with one or more embodiments of the present disclosure.

Turning now to FIG. 5, an example method for switching from a vehicle-locked view (or coupled virtual view) to a world-locked view (or decoupled virtual view) is shown. Specifically, method 500 includes generating the vehicle-locked view as a default view, and includes switching from the vehicle-locked view to the world-locked view when a trigger is detected as shown below.

Method 500 begins at 502. At 502, method 500 includes capturing via physical camera(s) mounted on the vehicle, image data from one or more perspectives relative to the vehicle. As described previously, one or more physical cameras may be mounted to the vehicle at different locations. For example, the vehicle may include a front-facing camera mounted to a front bumper of the vehicle, a rear-facing camera mounted to a rear bumper of the vehicle, a camera mounted a left mirror of the vehicle, and a camera mounted to a right mirror of the vehicle. Each of these cameras capture a different perspective relative to the vehicle. Together, the image data from the cameras may be used to generate a vehicle-centric or vehicle-locked view.

At 504, method 500 includes determining a vehicle-locked virtual camera position that is coupled to the physical camera(s). Herein, the vehicle-locked virtual camera position may be coupled to the vehicle and the cameras. Said another way, the vehicle onto which the cameras are attached is used as the center of reference for the vehicle-locked virtual camera position. In this way, the vehicle-locked virtual camera may be able to move with the vehicle and the cameras.

At 506, method 500 includes generating a vehicle-locked virtual view of the vehicle from the vehicle-locked virtual camera position and further includes displaying the generated vehicle-locked virtual view on a display to a user of the vehicle. In case of the vehicle-locked virtual view, the vehicle remains static on the screen of the display as the surrounding environment moves.

In some examples, the vehicle-locked virtual view may be a default display mode until one of three triggers is encountered. At 508, 510, and 512, method 500 may check for the triggers as discussed below. It is to be understood that the three triggers described herein are exemplary, and any number or type of trigger may cause the system to switch from the default display mode in other examples.

At 508, method 500 includes determining if a user input requesting a change from the vehicle-locked virtual view to a world-locked virtual view is received. In case of the vehicle-locked virtual view, the vehicle remains static while the "world" or the environment in which the vehicle is located moves on the display. During some instances, it may be more advantageous to maintain the "world" locked while the vehicle appears to move. One such example instance is when a vehicle is parked, as discussed previously. While parking the vehicle, the user may prefer to the world-locked virtual view as opposed to the vehicle-locked virtual view, and may accordingly request for the change via the user input at 508. If the user input is received at 508 (e.g., "YES" at 508), then method 500 proceeds to 514, otherwise method returns to 506 where the vehicle-locked virtual view is continued to be generated and displayed.

At 510, method 500 includes determining if objects are detected in the vicinity of the vehicle. Objects may be detected based on the output of one or more position sensors, image sensors, and proximity sensors. As an example, a proximity sensor may be mounted to the vehicle, and the sensor may emit an electromagnetic field or a beam of electromagnetic radiation (infrared, for instance). If there is any change in the return signal, then it may indicate the presence of a nearby object.

Consider an example where the vehicle is driven near a mall parking lot. A proximity sensor (such as an ultrasonic sensor) may detect a shopping cart in the vicinity of the vehicle. Upon detecting the cart, the method may automatically proceed to 514 to switch virtual views.

In some examples, a pedestrian crossing a crosswalk may be detected as the vehicle is approaching the crosswalk based on the output of the front-facing camera. Accordingly, the method may automatically proceed to 514 to change the virtual view.

At 512, method includes determining of a speed of a vehicle is below a threshold. As such, the speed of the vehicle may be determined based on a speed sensor mounted to the vehicle. If the speed of the vehicle is below the threshold, then it may be advantageous to provide a world-locked virtual view and consequently, method 500 proceeds to 514. As an example, if the vehicle is nearing an intersection and is about to make a turn at a lower speed (e.g., 10 mph), and additionally there are vehicles and/or bicycles parked to a side of the road. In such an example, it may be advantageous to provide a world-locked view to the user of the vehicle to facilitate maneuvering the vehicle without hitting the other vehicles/bicycles parked along the side of the road. At such low speeds, it is possible to lock the virtual camera to a location on the world and provide a world-locked virtual image to the user.

If none of the triggers (checked at 508, 510, and 512) occur, then method 500 returns to 506 where the method includes generating and displaying the vehicle-locked view to the user.

If one or more of the triggers checked at 508, 510, and 512 return "YES", then method proceeds to 514 where method includes switching from the vehicle-locked virtual view to the world-locked virtual view. Switching from the vehicle-locked virtual view to the world-locked virtual view may include decoupling the virtual camera from the physical camera(s) and further include determining a world-locked virtual camera position at 516. Further, method 500 includes generating a world-locked virtual view from the world-locked virtual camera position at 518.

Figure 6:
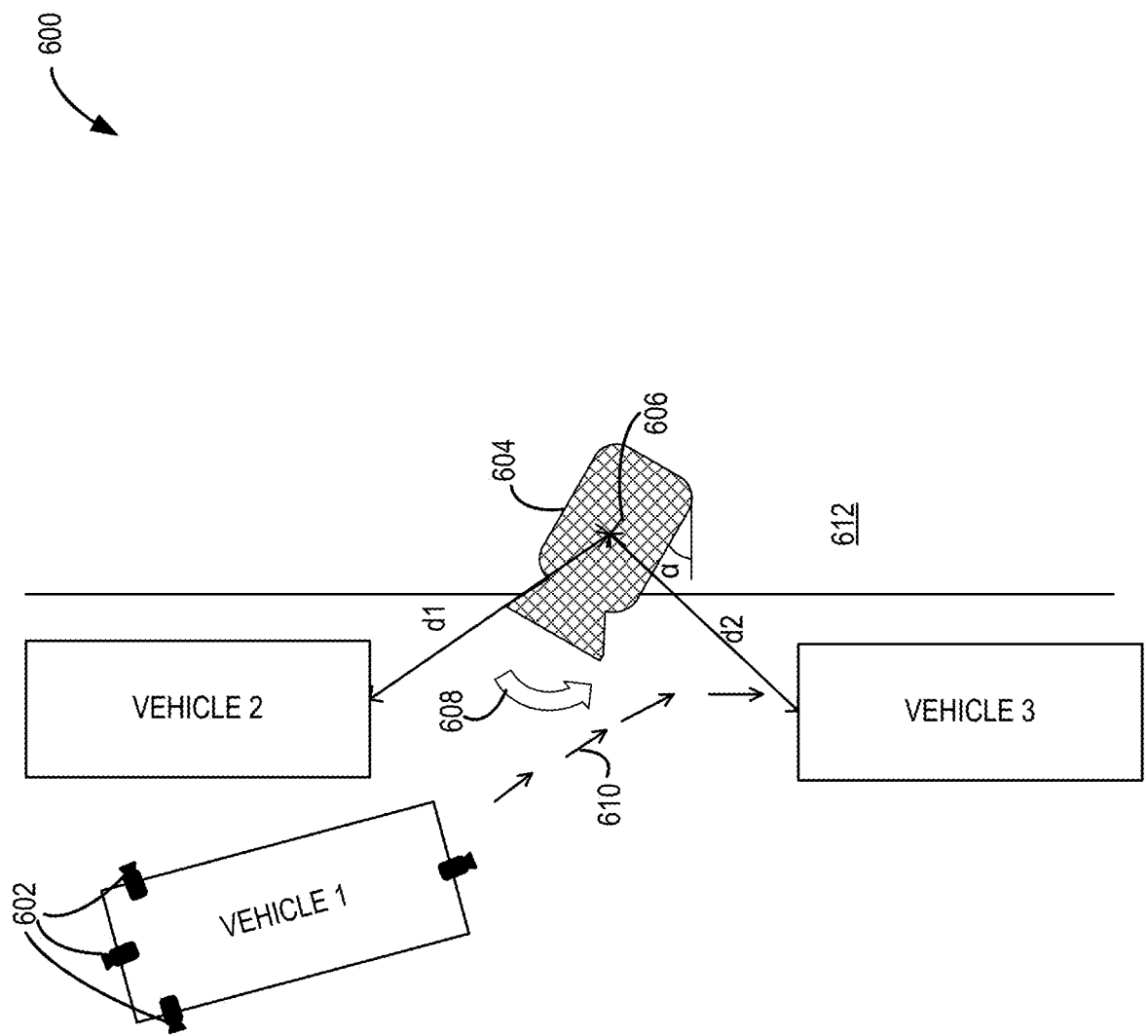
FIGS. 6-8 show example scenarios where the world-locked virtual view of a vehicle is adjusted by adjusting a position and an orientation of the virtual camera position in accordance with one or more embodiments of the present disclosure.
Figure 7:
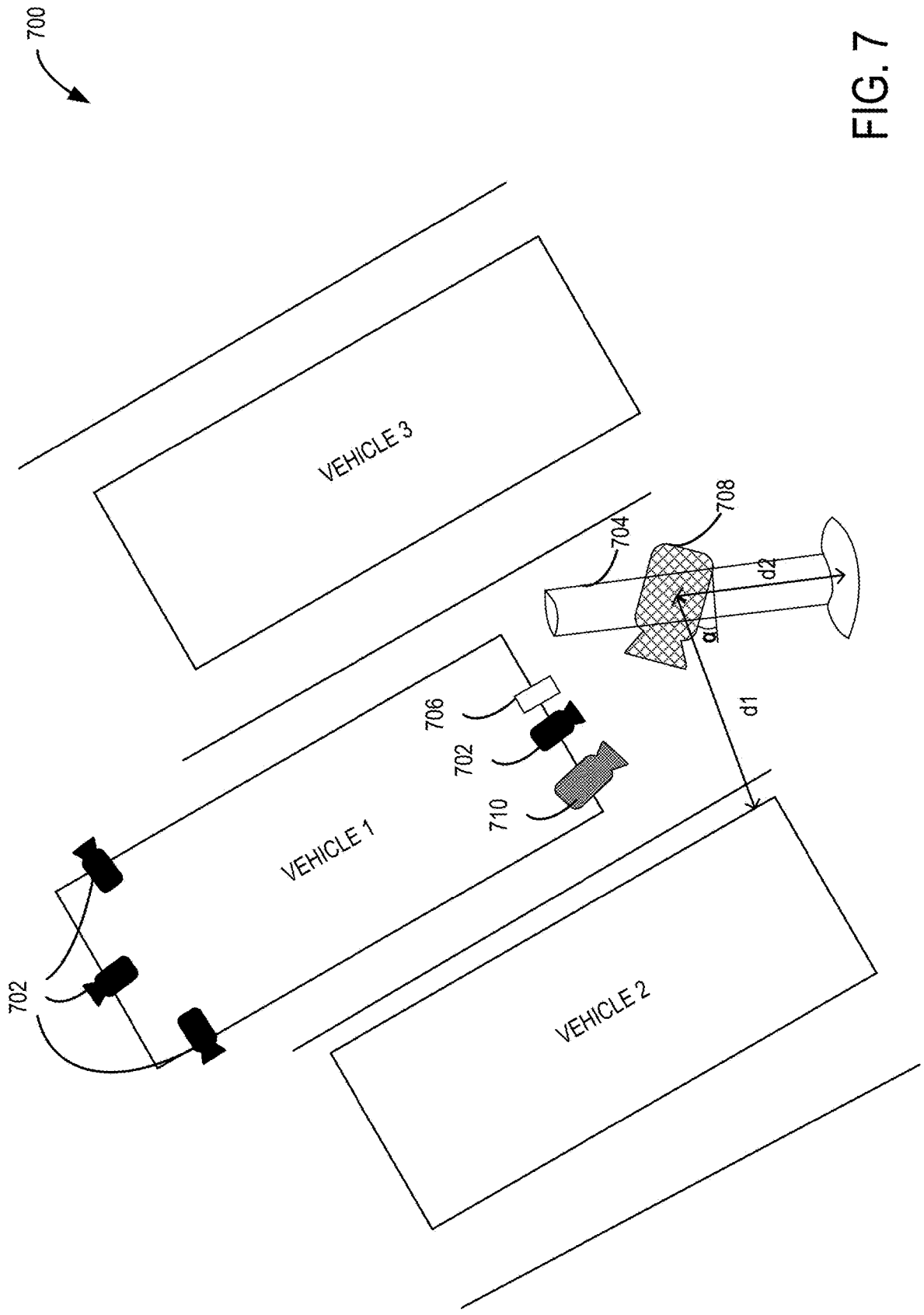
Figure 8:
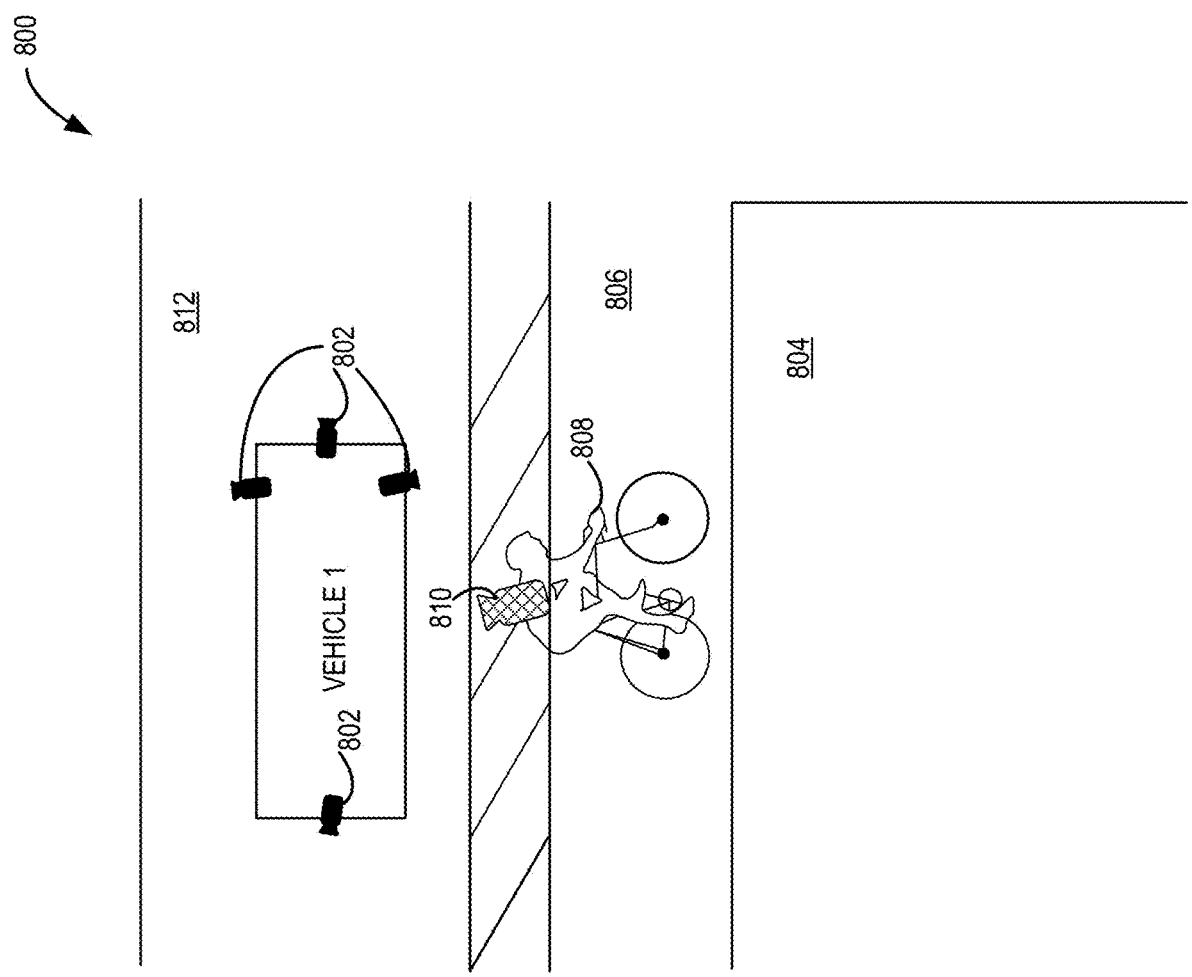

In one example, the decoupling of the virtual camera from the physical camera(s) may be achieved by measuring the wheel rotation and/or steering wheel angle variations and counter compensating from the measured wheel rotation and/or steering wheel variations. In another example, the method may decouple the virtual camera from the physical camera(s) by using at least one world reference to fix the virtual camera to the world reference and from one video frame to the other. For example, in the parking the vehicle, the method may detect the curb and the bumper of the car in front, and would continue detecting at each video frame and additionally place the virtual camera at a fix distance and angle to both the curb and the bumper, making the virtual camera appear fixed in the world. In this way, the world-locked camera position may be decoupled from the physical camera(s), and a world-locked virtual view may be generated. Some example scenarios in which the world-locked virtual view provides an enhanced perspective for the user are shown in FIGS. 6-8, described further below.

At 520, method 500 includes determining if an exit from the world-locked virtual view is requested. As discussed previously, the user may wish to exit the world-locked virtual view and may accordingly request the exit at 520. In some examples, if the object that was previously detected in the vicinity of the vehicle (e.g., at 510) is no longer present near the vehicle, then the method may automatically wish to exit from the world-locked virtual view. In some more examples, if the vehicle speed increased above the threshold speed, then the method may automatically wish to exit out of the world-locked virtual view. If exit from the world-locked virtual view is not requested (e.g., "No" at 520), then method 500 returns to 502 where new/updated image data is received and the world-locked virtual view may be continued to be generated and displayed as described until any of the exit conditions are met. If the world-locked view persists beyond where the physical cameras can generate a virtual view from a specific virtual camera location, the system may make the virtual camera "jump forward" to a new location where it can continue to generate a world-locked virtual view.

However, if the exit from world-locked virtual view is requested at 520 (e.g., "YES" at 520), then method 500 proceeds to 522, where the method includes stopping the generation of the world-locked virtual view. In one example, stopping the world-locked virtual view may include coupling the virtual camera to the physical camera(s) of the vehicle and generating and displaying the vehicle-locked view at 524. In some other examples, stopping the world-locked virtual view may include completely exiting out of the virtual view at 526, which includes not generating and/or not displaying any virtual view. Method 500 returns.

In this way, the example method may automatically switch from the vehicle-locked virtual view to the world-locked virtual view when one or more triggers (such as user activation, object detection, vehicle speed lower than threshold, and/or other triggers such as location-based triggers associated with a location in which a world-locked view is helpful) are encountered. In addition, the method includes switching back from the world-locked virtual view to the vehicle-locked virtual view when an exit condition is encountered. As such, the exit condition may include one or more of user deactivation, no object detected in vicinity, and vehicle speed increasing above the threshold.

Turning now to FIG. 6, an example scenario 600 is shown where a current vehicle (vehicle 1) is being parked between two stationary vehicles, vehicle 2 and vehicle 3 along a curb 612. When a user of vehicle 1 engages a reverse gear, for example, the decoupled virtual view may be automatically initiated. In another example, the user of vehicle 1 may select the decoupled virtual view to assist with parking the vehicle. In yet another example, when speed of vehicle 1 drops below a threshold, like in the case when the user is parking vehicle 1, the decoupled virtual view may be automatically activated.

As described earlier, the decoupled virtual view may be generated using image data from a plurality of physical cameras 602 mounted on vehicle 1. As such, the decoupled virtual view may be generated by positioning a decoupled virtual camera 604 at a location 606 on the curb 612 and using one or more vehicles 2 and 3 as world references. For example, vehicle 2 and vehicle 3 may be detected in each frame of image data generated by the plurality of cameras 602, and then the virtual camera 604 may be placed at distance d1 from vehicle 2 and a distance d2 from vehicle 3. In one example, d1 may be set equal to d2. In other examples, d1 may be different from d2. In addition, a viewing angle α of the virtual camera 604 may be fixed. In this way, by fixing the virtual camera 604 at fixed distance and angle, the virtual camera 604 may appear fixed in the world. Thus, the view generated by the virtual camera 604 at the location 606 may be decoupled or world-locked virtual view. In this view, vehicle 1 would appear to move while vehicles 2 and 3 may be static. The decoupled virtual view may be displayed to the user of vehicle 1. In this way, the user may be able to visualize the movement of vehicle 1 relative to the parked vehicles 2 and 3 and further maneuver vehicle 1 along arrows 610 to position vehicle 1 in between vehicle 2 and 3. In this way, the decoupled virtual view may assist the user in parking vehicle 1.

In some examples, the distance at which the virtual camera 604 is positioned between vehicle 2 and 3 and/or the viewing angle α may be automatically changed. As an example, while the user is maneuvering vehicle 1 in the space between vehicle 2 and vehicle 3, if vehicle 1 is detected to be too close to vehicle 2, then the virtual camera position may be automatically repositioned. For example, the virtual camera 604 may be moved closer to vehicle 2 and the viewing angle α may be decreased (along arrow 608, for example) to generate a "zoomed-in" and/or "close-up" view of the position of vehicle 1 relative to vehicle 2.

In this way, decoupled virtual views may include views that are static with the environment and views that move with the environment while remaining independent from (or at least not derived from) vehicle movements. Another example of such decoupled virtual views includes providing a smooth transition between different virtual positions via a preprogrammed virtual camera path that is based on a vehicle status and/or position. In one such scenario, a vehicle may move forward and backward during a parking maneuver. While the vehicle is moving forward, a virtual camera position may be located in front of the vehicle, facing toward the vehicle (and may be maintained in a same position in the environment even as the vehicle moves forward). When the vehicle is shifted to a reverse gear and/or begins moving in reverse, the detection of this condition by associated sensors may trigger the virtual view system to transition to a decoupled virtual view in which the virtual camera is positioned at a rear of the vehicle, facing toward the vehicle (and may be maintained in a same position in the environment even as the vehicle moves rearward). In order to provide a smooth transition between the forward virtual camera position and the rearward virtual camera position described above, the virtual view system may move the virtual camera in a preprogrammed virtual camera path that begins at the forward virtual camera position, traverses over and/or around the vehicle, and ends at the rearward virtual camera position, thereby providing a "flyby" or "flyover" effect in which the virtual camera moves within the environment independently of movement of the vehicle.

In another example, if vehicle 1 is too close to the curb 612, then the virtual view may be switched from the decoupled view to coupled virtual view. At any time during the maneuvering, the user may switch between the decoupled and the coupled view. In some examples, the decoupled virtual view may be "locked". In such an example, the distances d1 and d2, and the angle α may be fixed until vehicle 1 is parked between vehicle 2 and vehicle 3. As another example scenario of switching views, the virtual view system may receive an indication (e.g., from an associated sensor or sensors) that the vehicle is nearing an intersection (e.g., a "T" intersection) and is preparing to turn right at the intersection (e.g., based on a turn signal indicator). In response, the virtual view system may set a virtual camera position at a front region of the vehicle, facing away and to the left of the vehicle in order to assist the driver in merging with the traffic arriving from the left of the vehicle. The virtual view at that position may be maintained static within the environment even as the vehicle moves, until the vehicle has successfully merged into traffic, at which point the virtual view may be switched to another view (e.g., a coupled view that moves with the vehicle, or a different decoupled view). The above example scenario also shows how a given world-static virtual view may be directed away from a vehicle and may not include the vehicle/a representation of the vehicle (or may only include a truncated representation of a position of the vehicle to help a driver determine the position of the view relative to the vehicle).

In some examples, the virtual camera may be affixed near to objects detected by sensors coupled to vehicle 1, as shown in FIG. 7. Turning now to FIG. 7, an example scenario 700 is shown where a virtual view displayed to a user of vehicle 1 switches from a coupled virtual view to a decoupled virtual view upon detecting an object 704, such as a bollard or other obstacle. For example, the user of vehicle 1 may prefer to have a coupled virtual view while parking between vehicles 2 and 3. Accordingly, a coupled virtual camera 710 may be positioned and a coupled virtual view may be displayed to the user. In this example, the coupled virtual camera 710 is coupled to a plurality of physical cameras 702 mounted on vehicle 1.

However, as vehicle 1 is reversing into the spot between vehicle 2 and 3, a proximity sensor 706 may detect the object 704 in the vicinity of vehicle 1. In one example, the object 704 may be a pillar or column. In another example, the object 704 may be a shopping cart. Upon detecting the object 704 based on the output of the proximity sensor 706, the virtual view may automatically switch from the coupled virtual view to the decoupled virtual view. Generating the decoupled view may include decoupling a virtual camera 708 from the plurality of physical cameras 702, and further positioning the decoupled virtual camera 708 at a distance d1 from vehicle 2 and at distance d2 along a length of the object 704. In addition, the viewing angle α may be fixed relative a horizontal line. In this way, the view may be switched automatically from coupled to decoupled virtual view upon detecting objects in the vicinity of the vehicle.

Another example scenario 800 is shown in FIG. 8, where a decoupled virtual view is generated by fixing a virtual camera 810 on an object 808 that is moving at slower speeds. For example, the object 808 may be a bicyclist travelling at lower speeds along a bike path 806. Vehicle 1 may be travelling along a lane 812 and may be about to take a right turn at curb 804. In one example, the object may be detected based on output of a plurality of cameras mounted 802 on vehicle 1. Upon detecting the object 808, a decoupled virtual camera 810 may be positioned on the object 808. As the object moves, the virtual camera portion may also move. In this way, the user of vehicle 1 may be able to determine the position of vehicle 1 relative to the object 808 at all times. In one example, vehicle 1 could be a fighter jet and object 808 could be a fueling line from a refueling craft. In some examples, if a speed of the object 808 and/or a speed of vehicle increases above a threshold speed, then the virtual view may be switched from the decoupled view to a coupled view. In another example, if the object 808 makes a right turn while vehicle 1 continues straight on lane 812 without taking a right turn, the decoupled virtual camera 810 may no longer be positioned on the object 808. In one example, a new position of the decoupled virtual camera may be determined. In another example, the decoupled virtual view may be changed to a coupled virtual view, and accordingly, the position of a coupled virtual camera may be determined. In this way, based on the driving condition and/or detection of objects, the virtual view may be changed from decoupled virtual view to coupled virtual view.

Figure 9:
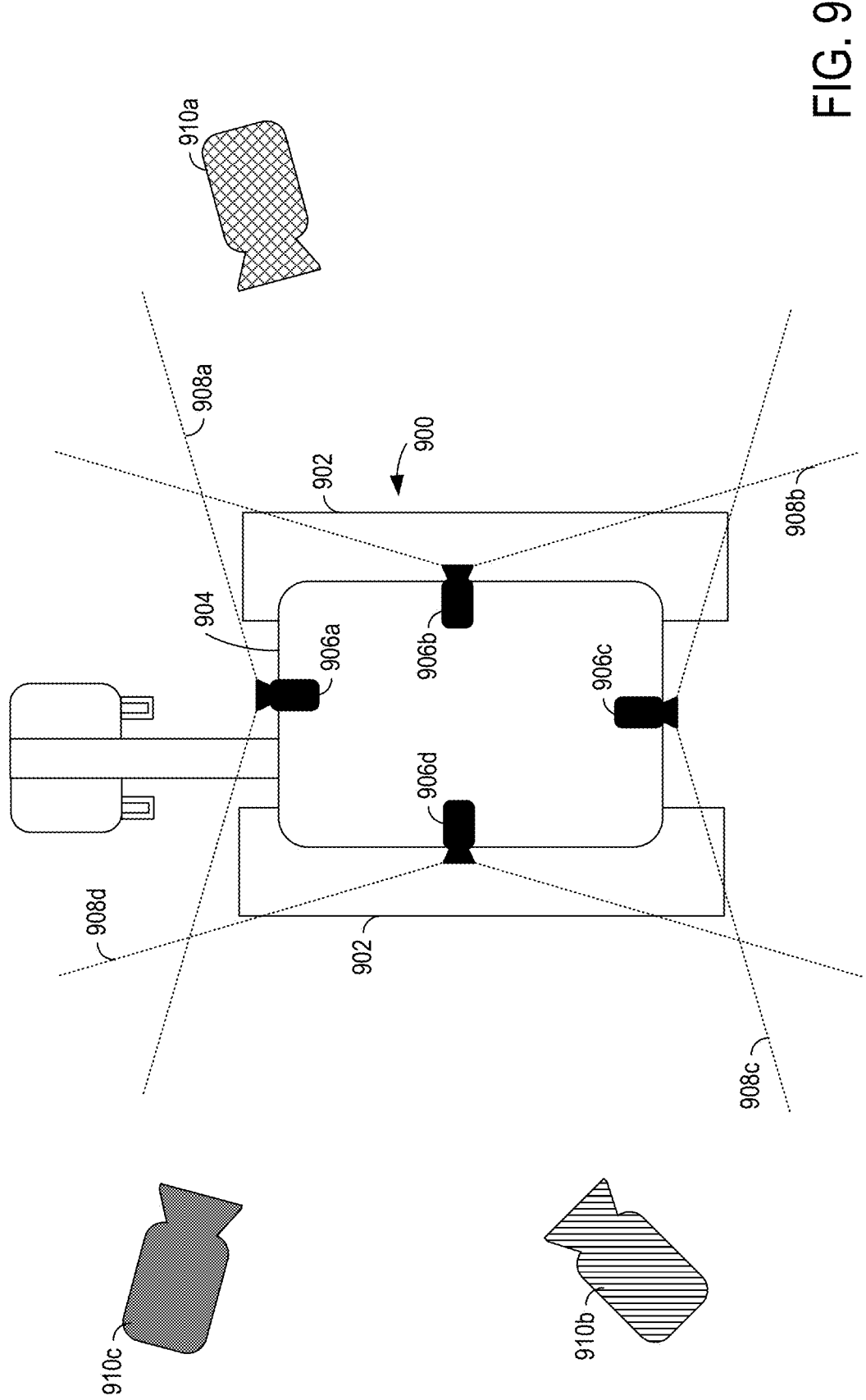
FIG. 9 shows an example scenario where a virtual camera may be placed to generate a view at any desired location where the physical cameras provide sufficient image information to generate a virtual view in accordance with one or more embodiments of the present disclosure.

FIGS. 9-12 show example scenarios of adjusting virtual views for moving vehicles. In FIG. 9, an example movable object 900 is schematically shown as being movable via tracks 902 (e.g., tread tracks for allowing the movable object to freely traverse the environment, such as over rough terrain). Movable object 900 may be a construction/industrial vehicle, such as an excavator, mining cart, locomotive, crane, and/or any other vehicle that is movable and/or that includes movable components. For example, movable object 900 may include one or more movable components, such as a rotatable cab 904. Accordingly, the movable object 900 may be movable in a first degree of freedom (e.g., a lateral and/or longitudinal movement) via the tracks and movable in a second degree of freedom (e.g., rotational movement) around an axis associated with the vehicle (e.g., a rotational axis of the cab). The movable object 900 may also be described as having first and second parts that are movable relative to one another, such as the tracks of the movable object being movable (e.g., to move the entire movable object) across the environment, and the cab being movable even when the movable object is otherwise stationary (noting that the cab may also move while the tracks are moving, but in such a scenario would be moving in a different degree of freedom than the tracks).

Movable object 900 may include one or more physical cameras mounted on the vehicle. For example, physical cameras 906a (front), 906b (first side), 906c (rear), and 906d (second side) are illustrated in FIG. 9. It is to be understood that the movable object 900 may include any number of physical cameras in any position on the vehicle without departing from the scope of this application. Each physical camera captures images within an associated field of view originating at a physical location of the associated camera. The perspective of each physical camera may originate at the physical location of the associated camera and extend outward, bound by the field of view and based on the orientation of the associated camera. The field of view of each physical camera 906a-906d is schematically illustrated by the dashed lines 908a-908d, respectively in FIG. 9. As shown, the field of view of each physical camera at least partially overlaps with at least one other physical camera mounted on the vehicle. In this way, image data from each physical camera may be stitched together by aligning objects imaged at multiple perspectives. Furthermore, a location and other features of imaged objects may be resolved by determining which cameras image the object, and by determining a view of the object at the different physical perspectives provided by the physical cameras.

As discussed above, the image data from the physical cameras may be processed and used to generate a virtual view or virtual image of the object captured from a virtual position of a virtual camera. Example virtual positions of virtual cameras are schematically illustrated in FIG. 9. For example, virtual camera 910a has a front first side position, virtual camera 910b has a rear second side position, and virtual camera 910c has a front second side position. Virtual images or views of the movable object 900 as captured by the virtual camera 910a may have a virtual perspective that originates at the virtual position of virtual camera 910a (e.g., a front first side of the movable object 900) and extends toward the object.

In some examples, a user may be provided with an option of placement for a virtual camera. For example, a display within the movable object and/or proximate the user may display options for virtual positions and/or orientations at which a virtual camera may be located. Using the schematic illustration of FIG. 9 as an example, the virtual cameras 910a-910c may be displayed as selectable user interface elements that the user may select to indicate a preferred virtual camera position/orientation. One or more suggested positions may be displayed to a user for selection in some examples, while in other examples a user may select any position within a selectable region. An orientation of the virtual camera may be defined based on a selected virtual position, or may be selectable by user input (e.g., free/ infinite selection, or selection from within a range—such as a range of orientations that are directed toward the movable object).

Upon selection or assignment of a virtual position and orientation, a virtual view of the movable object may be generated and displayed to the user from the perspective of the virtual camera, where the perspective originates at the virtual position/location of the virtual camera and is directed toward the movable object and/or according to the associated orientation of the virtual camera. The virtual view may include a virtual image of the movable object that is continuously updated in real-time or near real-time based on images captured from real, physical cameras mounted to the movable object (e.g., cameras 906a-906d). The virtual view may show an environment of the movable object (e.g., derived from real-time images captured by the physical cameras) around a virtual representation of the movable object (e.g., derived from a stored representation of the movable object). In this way, the virtual view may display the substantially real-time position of the movable object in the real-world environment from a perspective of the virtual camera based on the images from the physical cameras mounted on the movable object.

Figure 10:
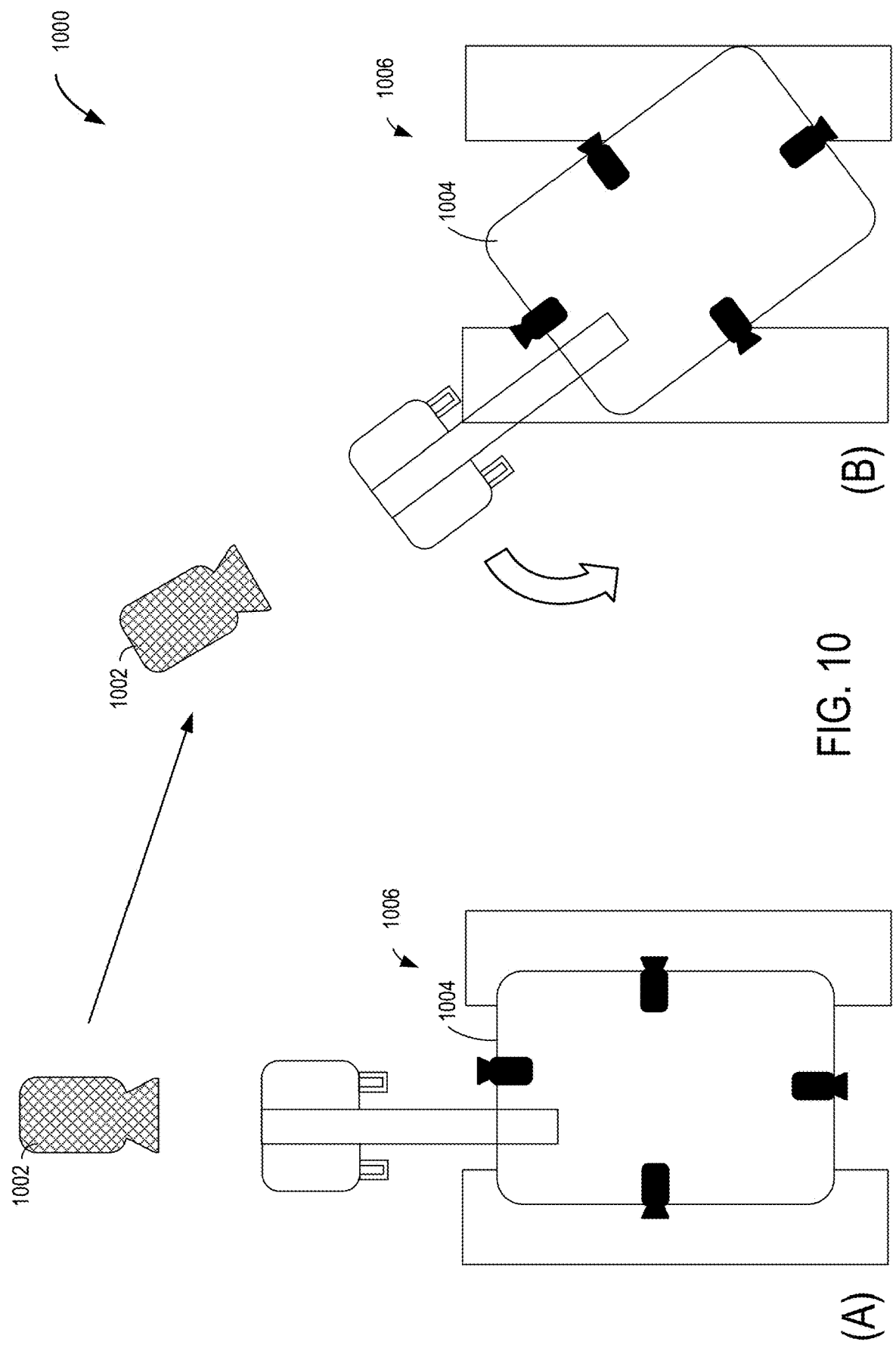
FIG. 10 shows an example scenario where the virtual camera is not world-locked and its position moves in accordance to the movement of the physical cameras in accordance with one or more embodiments of the present disclosure.

The virtual view described above may assist a user (e.g., a driver) in maintaining awareness of the movable object's surroundings and may assist the user in performing maneuvers of the movable object. Examples have been described above regarding traffic maneuvers, navigation maneuvers, and parking maneuvers for road vehicles. However, the virtual view may also assist with other types of maneuvers for other types of vehicles. For example, the movable object and/or movable components of the object in FIG. 9 may move in different degrees in freedom. Depending on movement of the object and/or the associated movable components, a view from a particular perspective may provide more targeted assistance and context clues than other views. For example, in some contexts, views that move with the movable object and/or movable components may be selected (e.g., when movement is slow or below a threshold, and/or when movement is present in a predictable direction or particular degree of freedom). An example of such a coupled movement is illustrated in FIG. 10, where a virtual camera 1002 is shown changing in position and orientation to follow a rotation of a movable component (e.g., cab 1004) of a movable object 1006 to maintain a same perspective of the movable object/component as the object/component moves. For example, at (A), the virtual camera is positioned and oriented to capture a front view of the movable object/components. At (B), the virtual camera is still positioned and oriented to capture a front view of the movable component, since the virtual position and orientation of the virtual camera is moved to stay in front of the movable component (e.g., the cab 1004). The movable object 1006 and virtual camera 1002 may be similar to movable object 900 and virtual cameras 910a-910c of FIG. 9. Accordingly the description of these elements in FIG. 9 may also apply to the similarly-named components of FIG. 10.

Figure 11:
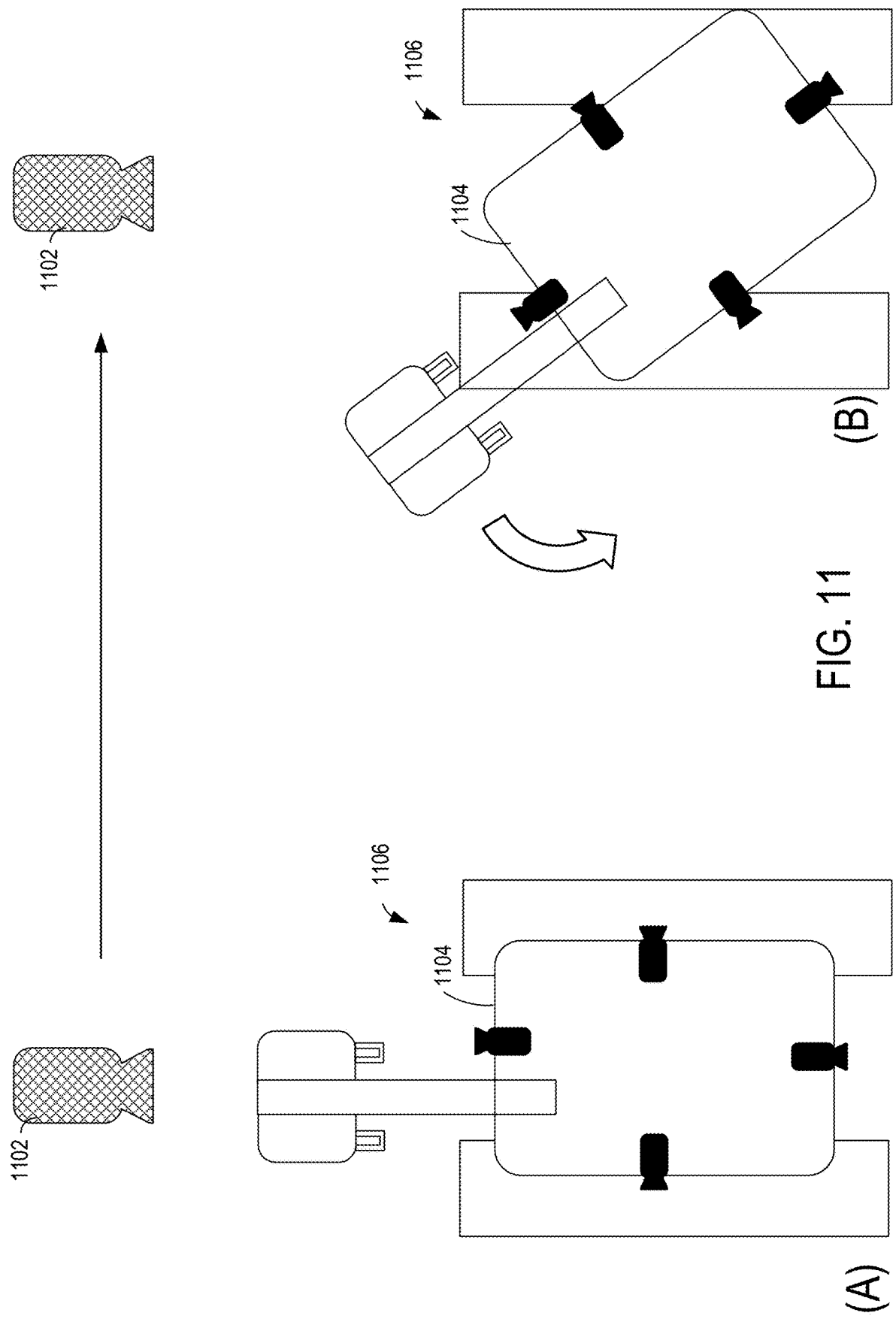
FIG. 11 shows an example scenario where the world-locked virtual view is adjusted for a movable object with one or more movable components in accordance with one or more embodiments of the present disclosure.

In other contexts, views that remain stationary even as the movable object and/or movable components move may be selected (e.g., when movement is fast or above a threshold, and/or when movement is present in a degree of freedom that experiences unpredictable or fast-changing movements). An example of such decoupled movement is illustrated in FIG. 11, where a virtual camera 1102 is shown remaining in a static position and orientation even as a movable component (e.g., cab 1104) of a movable object 1106 moves. The virtual camera in the example of FIG. 11 maintains a same perspective within the environment, but offers a changing perspective of the movable object/components as the movable object/components move. For example, at (A), the virtual camera is positioned and oriented to show a front view of the movable object/components. At (B), the virtual camera is maintained at the same position and orientation within the real-world (e.g., at a front of the movable object, but now to the side of the movable component), even though the movable component (e.g., cab 1104) rotates. The movable object 1106 and virtual camera 1102 may be similar to movable object 900 and virtual cameras 910a-910c of FIG. 9. Accordingly, the description of these elements in FIG. 9 may also apply to the similarly-named components of FIG. 11.

Figure 12:
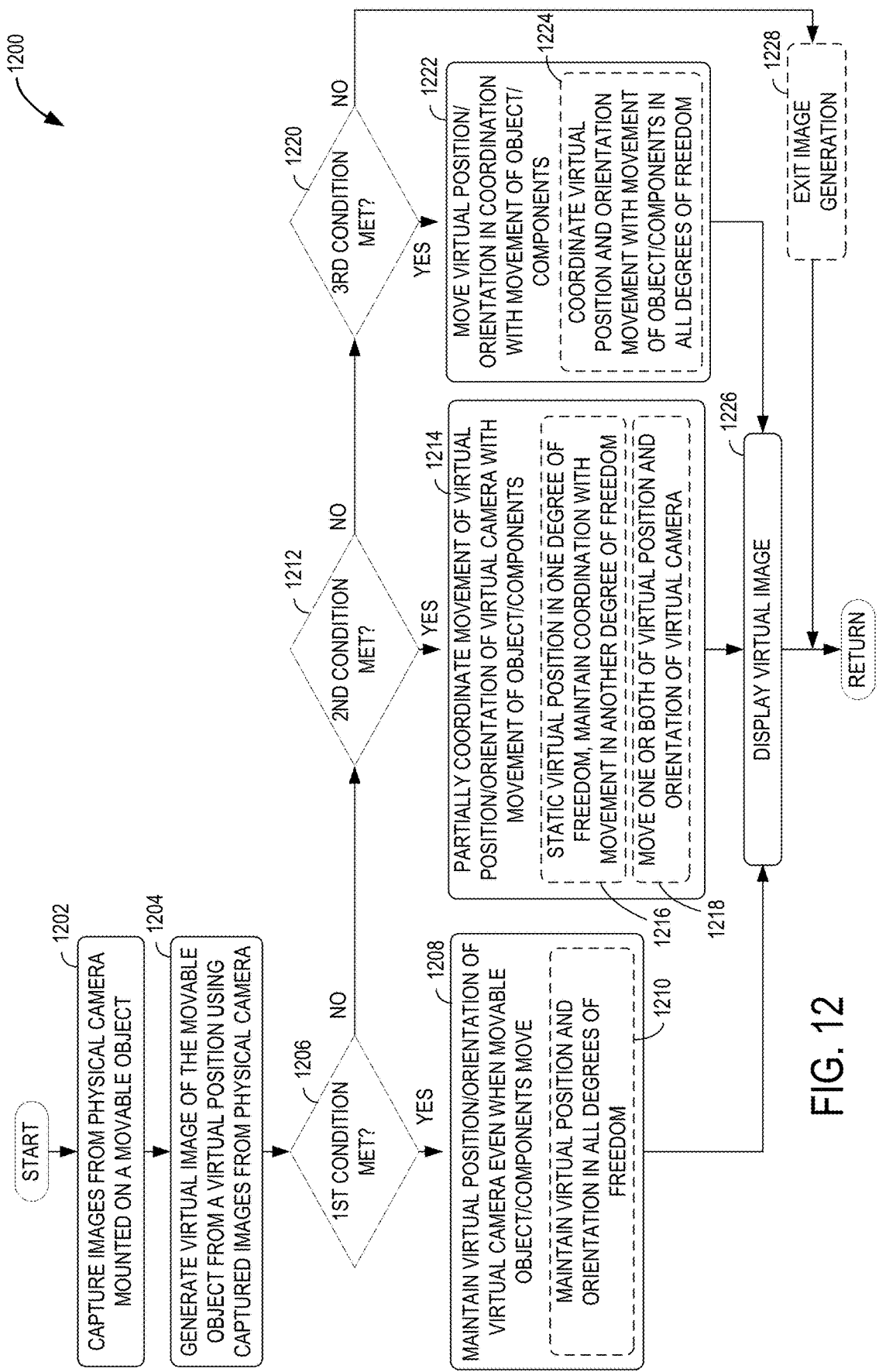
FIG. 12 shows a flow chart of an example method for operating the virtual camera in one of three modes: fully decoupled, partially decoupled, and fully coupled in accordance with one or more embodiments of the present disclosure.

FIG. 12 is a flow chart of an example method 1200 for generating virtual views of a movable object and/or movable components of a movable object. For example, method 1200 may be performed to generate a virtual view of a movable object, such as movable object 900, 1006, or 1106 of FIG. 9, 10, or 11, respectively, as captured by a virtual camera 910a, 910b, 910c, 1002, or 1102 of FIG. 9, 10, or 11, respectively. In other examples, method 1200 may be performed to generate a virtual view of any suitable movable object or movable component of a movable object, including those described herein with respect to FIGS. 1-8. At 1202, the method includes capturing images from a physical camera mounted on a movable object and/or movable component(s) of the movable object. In some examples, images may be captured from a plurality of physical cameras having at least partially overlapping fields of view relative to one another. At 1204, the method includes generating a virtual image of the movable object and/or movable component(s) of the movable object from a virtual position using the captured images from the physical camera(s). The virtual image may be captured from a perspective that originates at the virtual position and is directed toward the movable object/component(s) and/or a location to be occupied by the movable object/component(s). The virtual camera is thus aimed at a scene of interest, which may include the movable object (e.g., at all times), which may include the movable object at some times (e.g., but may not include the movable object at some other times), or which may not include the movable object at all.

At 1206, the method includes determining if a first condition is met. The first condition may correspond to a trigger for displaying a virtual view that is fully decoupled from movements of the movable object and/or movable components of the movable object. The first condition may include a user input that is received after a trigger for suggesting (via a user interface) a fully decoupled mode, such as a detection of a movement or state of the movable object that would benefit from maintaining a virtual position of the virtual camera in a static location as the movable object/components move. Such movements or states may include movements at a speed above a threshold in one or more degrees of freedom. If the first condition is determined to have been met (e.g., "YES" at 1206), the method proceeds to 1208 to maintain a virtual position and/or orientation of the virtual camera even when the movable object and movable components of the movable object move. As indicated at 1210, the virtual position and orientation may be maintained responsive to movements in all degrees of freedom (e.g., lateral/transverse movements, rotational movements, etc.).

In some examples, maintaining a static position and orientation relative to a movable object may include moving the virtual position and/or orientation in an opposite manner than the movements of the movable object/component. For example, a virtual camera may be positioned at a virtual location that is a clockwise angle β from a longitudinal axis of a movable object at an original position. The movable object may rotate from the original position at an angle α counterclockwise relative to the longitudinal axis at the original position. The system may compensate for the movement of the movable object by rotating the virtual camera clockwise by an angle equal to α at the same angular velocity as the corresponding rotation of the movable object. For example, equal and opposite movement of the virtual camera relative to movement of the movable object/component may cause the resulting virtual view to appear to remain static even as the vehicle (and the physical cameras, from which image data used in the virtual view is captured) move.

If the first condition is not met (e.g., "NO" at 1206), the method proceeds to 1212 to determine if a second condition is met. The second condition may correspond to a trigger for displaying a virtual view that is partially decoupled from movements of the movable object and/or movable components of the movable object. The first condition may include a user input that is received after a trigger for suggesting (via a user interface) a partially decoupled mode, such as a detection of a movement or state of the movable object that would benefit from maintaining a static virtual position of the virtual camera for movements in at least one degree of freedom and/or for movements of one or more movable components of the movable object, and that would benefit from having a coordinated movement of the virtual camera position/orientation in at least one other degree of freedom and/or for movements of one or more other movable components of the movable object. For example, a virtual view may maintain a static virtual position/orientation when a cab of movable vehicle swings/rotates, since such movement may be disorienting to the user if followed with the virtual camera. However, the virtual view may move with the movable vehicle while the vehicle moves via the tracks, since such movement may allow the user to continue to monitor the changing surroundings of the movable vehicle as the vehicle moves through the environment. If the second condition is met (e.g., "YES" at 1212), the method proceeds to 1214 to partially coordinate movement of the virtual position and/or orientation of the virtual camera with movement of the object and/or components. For example, as indicated at 1216, the virtual position may be static in one degree of freedom relative to movements of the object/components in that degree of freedom, and the virtual position may maintain coordination with movement of the object/components (e.g., be moved in accordance with the object/components) in another degree of freedom. As indicated at 1218, one or both of the virtual position or the virtual orientation may be moved to partially coordinate the movement of the virtual camera with movement of the object/component(s).

If the second condition is not met (e.g., "NO" at 1212), the method proceeds to 1220 to determine if a third condition is met. The third condition may correspond to a trigger for displaying a virtual view that is fully coupled to movements of the movable object and/or movable components of the movable object. The third condition may include a user input that is received after a trigger for suggesting (via a user interface) a fully coupled mode, such as a detection of a movement or state of the movable object that would benefit from continuously updating a virtual position of the virtual camera to track movements of one or more movable components of the movable object. For example, a virtual view may move with the movable vehicle while the vehicle is in constant/steady movement through an environment, since such movement may allow the user to continue to monitor the changing surroundings of the movable vehicle as the vehicle moves through the environment. If the third condition is met (e.g., "YES" at 1220), the method proceeds to 1222 to move the virtual position and/or orientation of the virtual camera in coordination with movement of the movable object and/or movable components of the movable object. As indicated at 1224, the virtual position and orientation of the virtual camera may be coordinated with movements of the movable object/components in all degrees of freedom.

Responsive to one of the three conditions being met (e.g., upon selectively updating the virtual position based on which condition is met), the method proceeds (e.g., after maintaining the virtual position/orientation at 1208, partially coordinating movement of the virtual position/orientation at 1214, or moving the virtual position/orientation at 1222) to 1226 to display the virtual image (e.g., generated as being captured from the virtual perspective originating at the virtual position and having the virtual orientation selectively adjusted at 1208, 1214, or 1222 respectively). If none of the conditions are met (e.g., "NO" at 1220), the method optionally includes exiting image generation at 1228. For example, if the vehicle is shut down, the virtual view image generation may be exited.

It is to be understood that a system according to the disclosure may only be configured to display a virtual view according to one or both of the above-described fully decoupled mode and the above-described partially decoupled mode (e.g., and not be configured to display a virtual view according to a coupled mode) without departing from the scope of the disclosure. Furthermore, any of the triggers or conditions described herein, or any other suitable trigger or condition for switching or controlling modes of a virtual view may be used in method 1200 as the first, second, or third condition (or trigger associated therewith). For examples, conditions may be associated with a sensed condition of the movable object (e.g., a speed, rotation, acceleration, etc. of the object or component of the object), a location of the movable object (e.g., a location associated with a maneuver that benefits from a particular mode of virtual view, the location being saved in a database of locations and/or a database associated with user preferences for a driver or other user associated with the movable object), a user preference, an environmental condition (e.g., current weather, ambient light, time of day, time of year [e.g., season], terrain, etc.), and/or any other condition or combination of conditions. A technical effect of the methods and systems described herein is that use of virtual views that are at least partially (or at least at some points in time) decoupled from physical cameras may show more complete environmental information than views generated by systems/methods that utilize only virtual views from virtual positions/orientations that are coupled to physical cameras on an object, allowing for more precise control of an associated movable object.

Figure 14A:
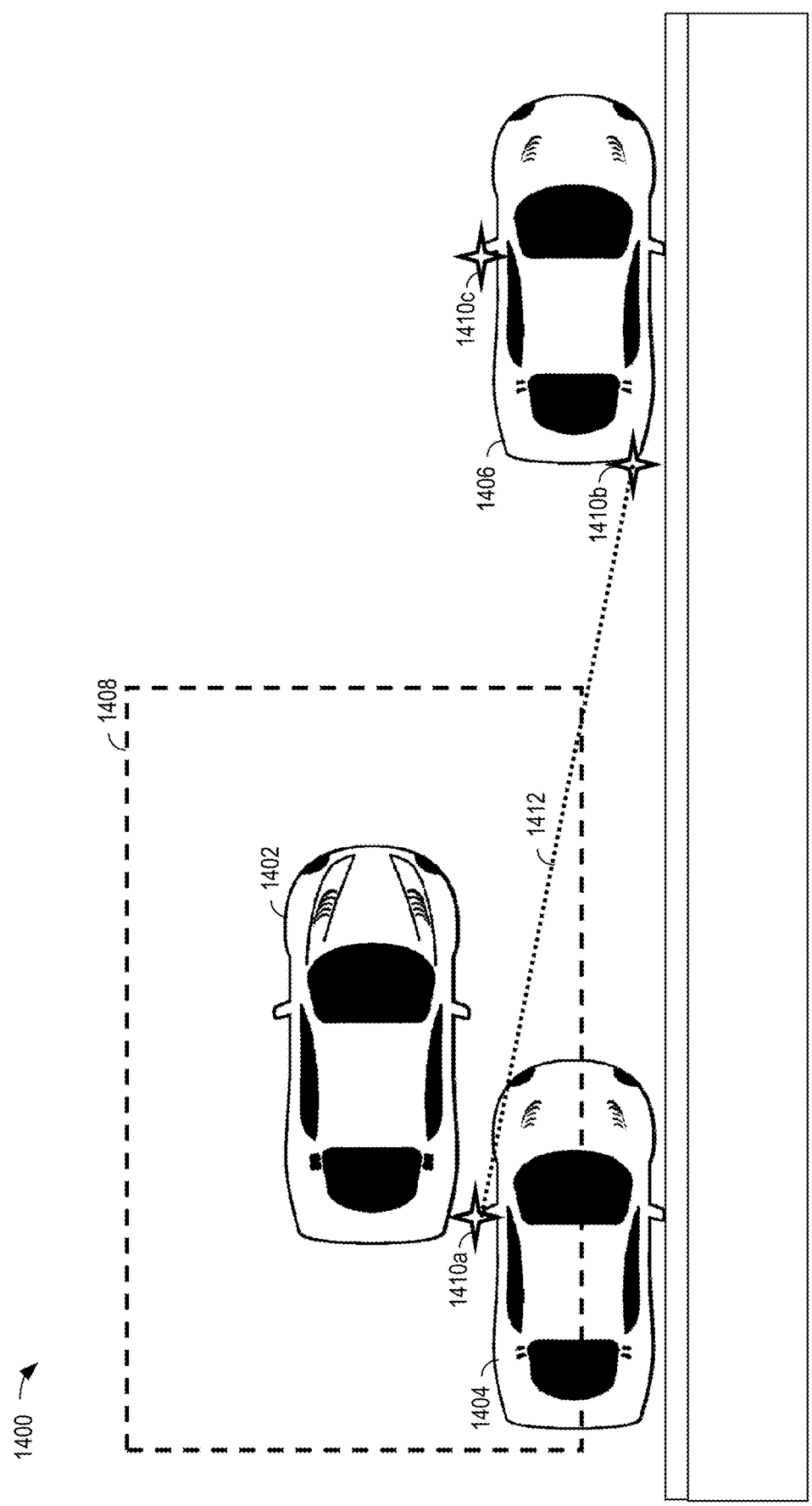
FIGS. 14A-14C show an example scenario of setting a virtual view of a moving object based on reference points in an environment in accordance with one or more embodiments of the present disclosure.

FIGS. 14A-18 show additional examples of controlling a virtual view of a movable object. For example, FIGS. 14A-14C show an example of controlling a virtual view of a movable object, such as vehicle 1402, based on objects in an environment 1400 of the vehicle 1402 (e.g., vehicle 1404 and vehicle 1406). In FIG. 14A, the vehicle 1402 is shown near an open space between vehicles 1404 and 1406. The vehicle 1402 may be a moving vehicle, while vehicles 1404 and 1406 may be parked. The vehicle 1402 may be an example of any of the vehicles described herein, such as vehicle 100 of FIG. 1A, and may include a virtual view system (such as virtual view system 102 of FIG. 1A) including a plurality of cameras for generating a virtual view of the vehicle and/or the environment of the vehicle. For example, the virtual view system of vehicle 1402 may assist the vehicle in parking between the parked vehicles 1404 and 1406.

A virtual view 1408 provided by the virtual view system of the vehicle 1402 is represented as a rectangular region surrounding vehicle 1402 as an illustrative example. It is to be understood that the bounds of virtual view 1408 may form a shape other than the exemplary rectangular shape and/or have a size other than the illustrated exemplary size without departing the scope of the disclosure. As the vehicle 1402 begins parking, the virtual view may enter a static mode, wherein the virtual view system is triggered to control the virtual view to be at least partially locked to a feature of the environment. For example, the vehicle may enter the static mode based on user input (e.g., as the user decides to begin parking, the user may select a corresponding button on an interface of a head unit of the vehicle to enter the static mode) and/or based on automatic detection (e.g., detecting a change in speed and/or acceleration, detecting a potential parking spot, and/or detecting another condition indicative of a driving maneuver that may be assisted by the static mode).

Figure 14B:
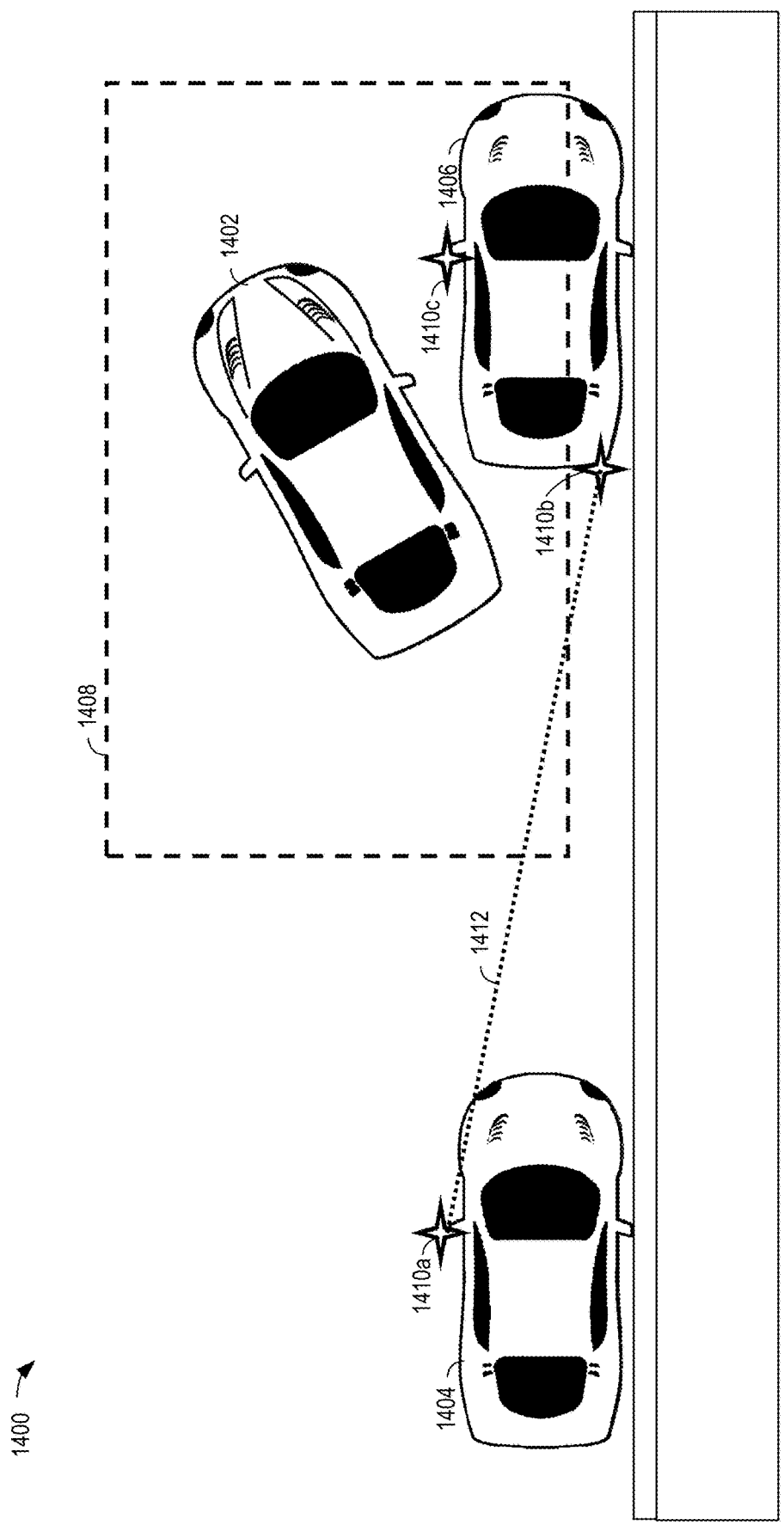

In the static mode, the virtual view system may analyze images captured by cameras of the vehicle 1402 to determine one or more reference points in the environment (e.g., reference points that are relevant to a detected or input driving maneuver). For example, in the parking scenario illustrated in FIG. 14A, the closest protruding elements of the parked vehicles (e.g., side mirrors) may form reference points 1410a and 1410c, and a farthest edge in a rear of the forward vehicle 1406 may form reference point 1410b. In performing a parallel park operation, features of front and rear vehicles around a parking spot may provide a guide for highlighting regions that may be helpful to see in the virtual view. A reference line, such as reference line 1412, between particular reference points may be drawn or calculated by the virtual view system to provide a guide for the system for maintaining an orientation of the virtual view throughout a static mode. The virtual view may be controlled to maintain the reference line in a parallel position to itself across each frame of the virtual view. For example, FIG. 14B shows the vehicle 1402 at a later stage of a parking maneuver, where vehicle 1402 has pulled alongside vehicle 1406 and started turning to back into the open area between vehicles 1404 and 1406. As shown, despite the rotation and/or other change in orientation of the vehicle 1402, the virtual view 1408 is shown having the same orientation relative to the reference line 1412 as when the vehicle 1402 was positioned/oriented as shown in FIG. 14A, and the reference line 1412 in FIG. 14B is parallel to the reference line 1412 in FIG. 14A. The virtual view 1408 was moved in one direction (e.g., the original traveling direction of the vehicle, forward with the vehicle), but did not change orientation relative to the reference line in the illustrated example.

Figure 14C:
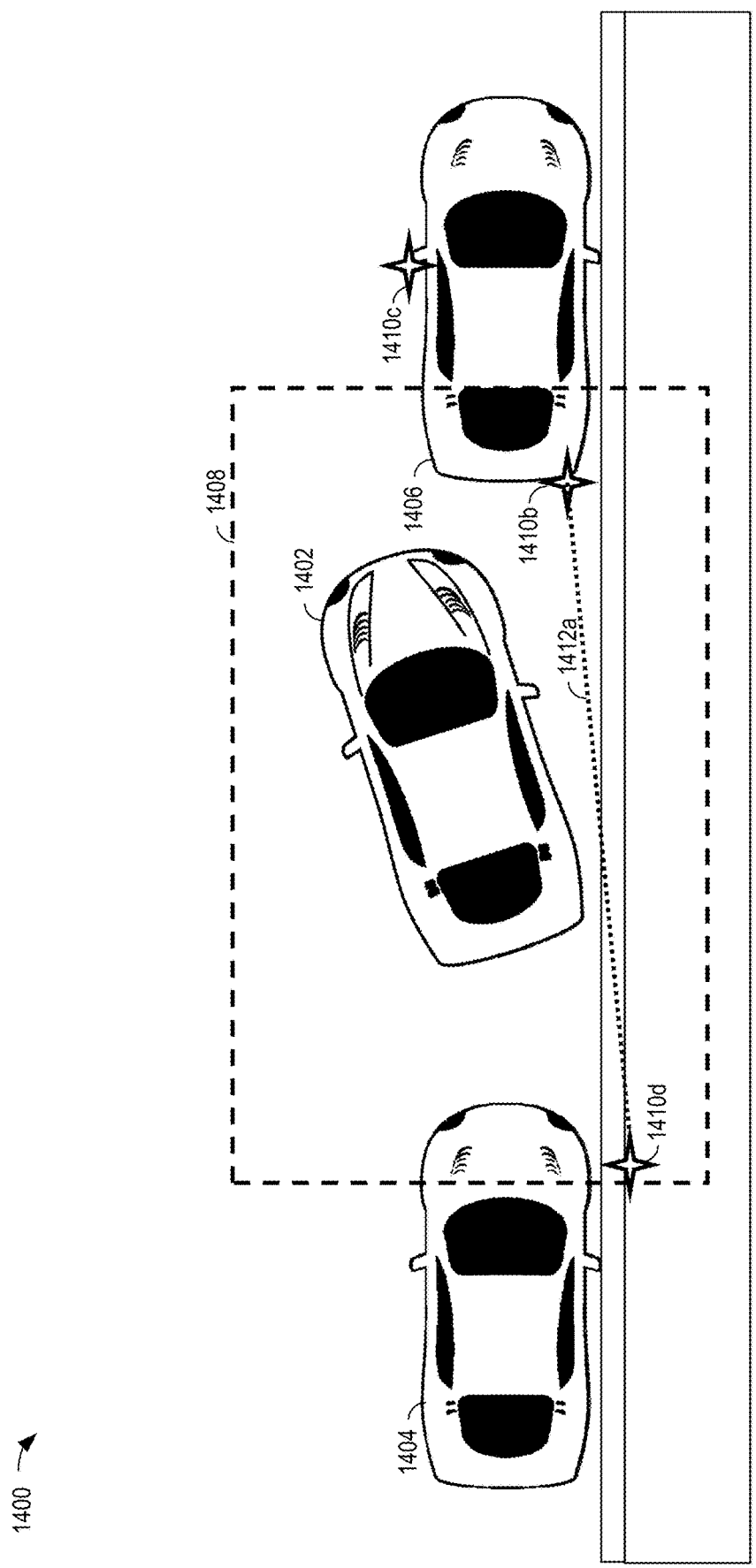

FIG. 14C shows the vehicle 1402 at a still later stage of the parking maneuver, where vehicle 1402 has reversed almost fully into the space between vehicles 1404 and 1406. As shown, the orientation of the virtual view 1408 is maintained the same even as the orientation of the vehicle 1402 changes. As the vehicle 1402 moves throughout the environment during the static mode, one or more reference points may fall out of view (e.g., reference pint 1410a of FIGS. 14A and 14B). Accordingly, new reference points may be selected, such as reference point 1410d, and a new reference line, such as reference line 1412a, may be drawn and/or calculated. Thereafter, the virtual view may be controlled such that a reference line drawn between reference points 1410b and 1410d in subsequent frames is maintained parallel to the reference line 1412a. An additional or alternative example to using the virtual reference line for guiding a static virtual view includes calculating a rotation of the vehicle and countering or compensating the rotation using one or more sensors, such as GPS sensors, gyroscopes, movement detected from steering wheel turns, and/or any of the sensing mechanisms described herein.

Figure 15A:
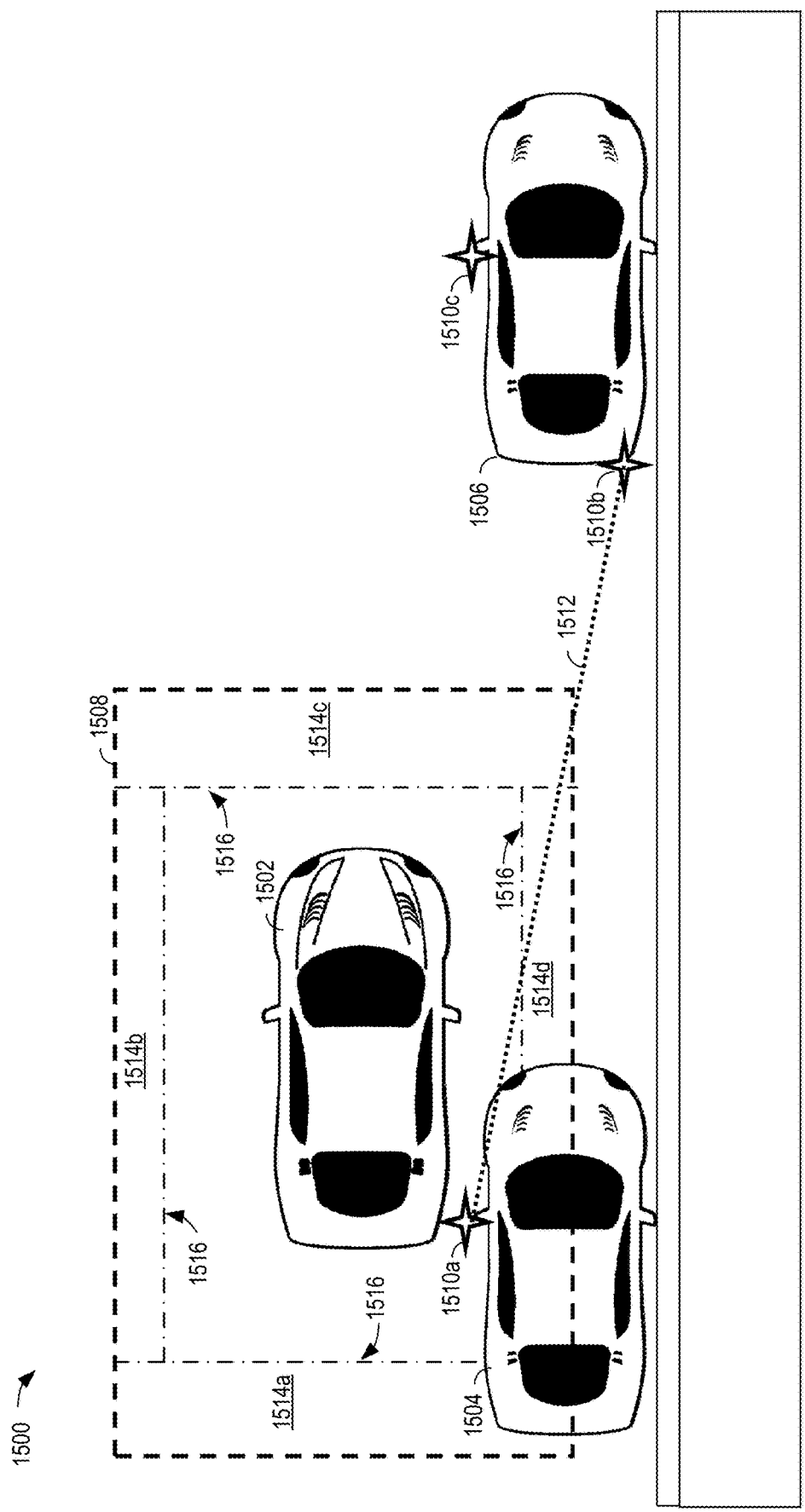
FIGS. 15A-15D show an example scenario of setting a virtual view of a moving object using shift regions in accordance with one or more embodiments of the present disclosure.

FIGS. 15A-15D show another example of operation of a vehicle in a static mode, in which a virtual view is moved only when a vehicle reaches a threshold distance of an edge of the virtual view (e.g., moves into a shift region denoted by shift lines). For example, FIGS. 15A-15D show an example of controlling a virtual view of a movable object, such as vehicle 1502, based on objects in an environment 1500 of the vehicle 1502 (e.g., vehicle 1504 and vehicle 1506). In FIG. 15A, the vehicle 1502 is shown near an open space between vehicles 1504 and 1506. The vehicle 1502 may be a moving vehicle, while vehicles 1504 and 1506 may be parked. The vehicle 1502 may be an example of any of the vehicles described herein, such as vehicle 100 of FIG. 1A, and may include a virtual view system (such as virtual view system 102 of FIG. 1A) including a plurality of cameras for generating a virtual view of the vehicle and/or the environment of the vehicle. For example, the virtual view system of vehicle 1502 may assist the vehicle in parking between the parked vehicles 1504 and 1506.

A virtual view 1508 provided by the virtual view system of the vehicle 1502 is represented as a rectangular region surrounding vehicle 1502 as an illustrative example. It is to be understood that the bounds of virtual view 1508 may form a shape other than the exemplary rectangular shape and/or have a size other than the illustrated exemplary size without departing the scope of the disclosure. As the vehicle 1502 begins parking, the virtual view may enter a static mode, wherein the virtual view system is triggered to control the virtual view to be at least partially locked to a feature of the environment. For example, the vehicle may enter the static mode based on user input (e.g., as the user decides to begin parking, the user may select a corresponding button on an interface of a head unit of the vehicle to enter the static mode) and/or based on automatic detection (e.g., detecting a change in speed and/or acceleration, detecting a potential parking spot, and/or detecting another condition indicative of a driving maneuver that may be assisted by the static mode).

Figure 15B:
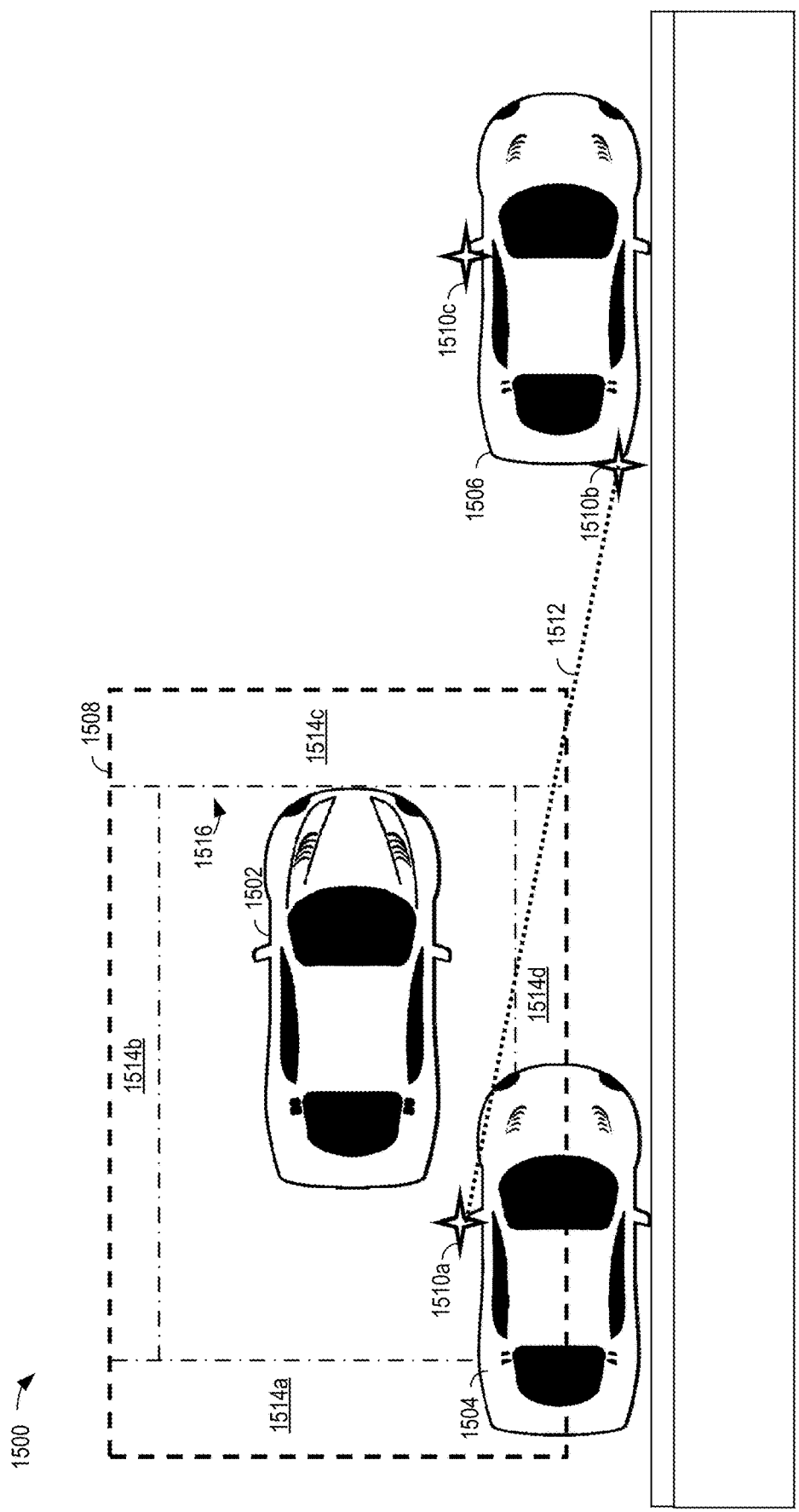

In the static mode, the virtual view system may analyze images captured by cameras of the vehicle 1502 to determine one or more reference points (1510a, 1510b, and 1510c) in the environment and/or to draw a reference line (1512) in the environment, and control the orientation and position of the virtual view 1508 as described above with respect to FIGS. 14A-14C. However, in the example of FIGS. 15A-15D, the virtual view 1508 may only be moved (e.g., in the travelling direction of the vehicle) when the vehicle 1502 enters a shift region. For example, FIG. 15A shows that virtual view 1508 includes shift regions 1514a, 1514b, 1514c, and 1514d, which are bound by shift lines 1516 and edges of the virtual view 1508. As shown in FIG. 15B, the virtual view 1508 may remain static (e.g., in the same position and orientation relative to the environment) even as the vehicle 1502 moves (e.g., forward), until the vehicle enters a shift region. For example, the vehicle 1502 is shown right at the edge of shift region 1514c in FIG. 15B, thus any movement of the vehicle 1502 forward may cause the virtual view 1508 to be shifted to realign with the vehicle 1502. When the virtual view is moved, an amount of movement may be predetermined and/or based on a speed/amount of movement of the vehicle. For example, the virtual view 1508 may realign to be centered on the vehicle once the vehicle enters a shift region, then remain in the new position until the vehicle again enters a shift region (at which time the virtual view realigns to be centered on the vehicle, etc.).

Figure 15C:
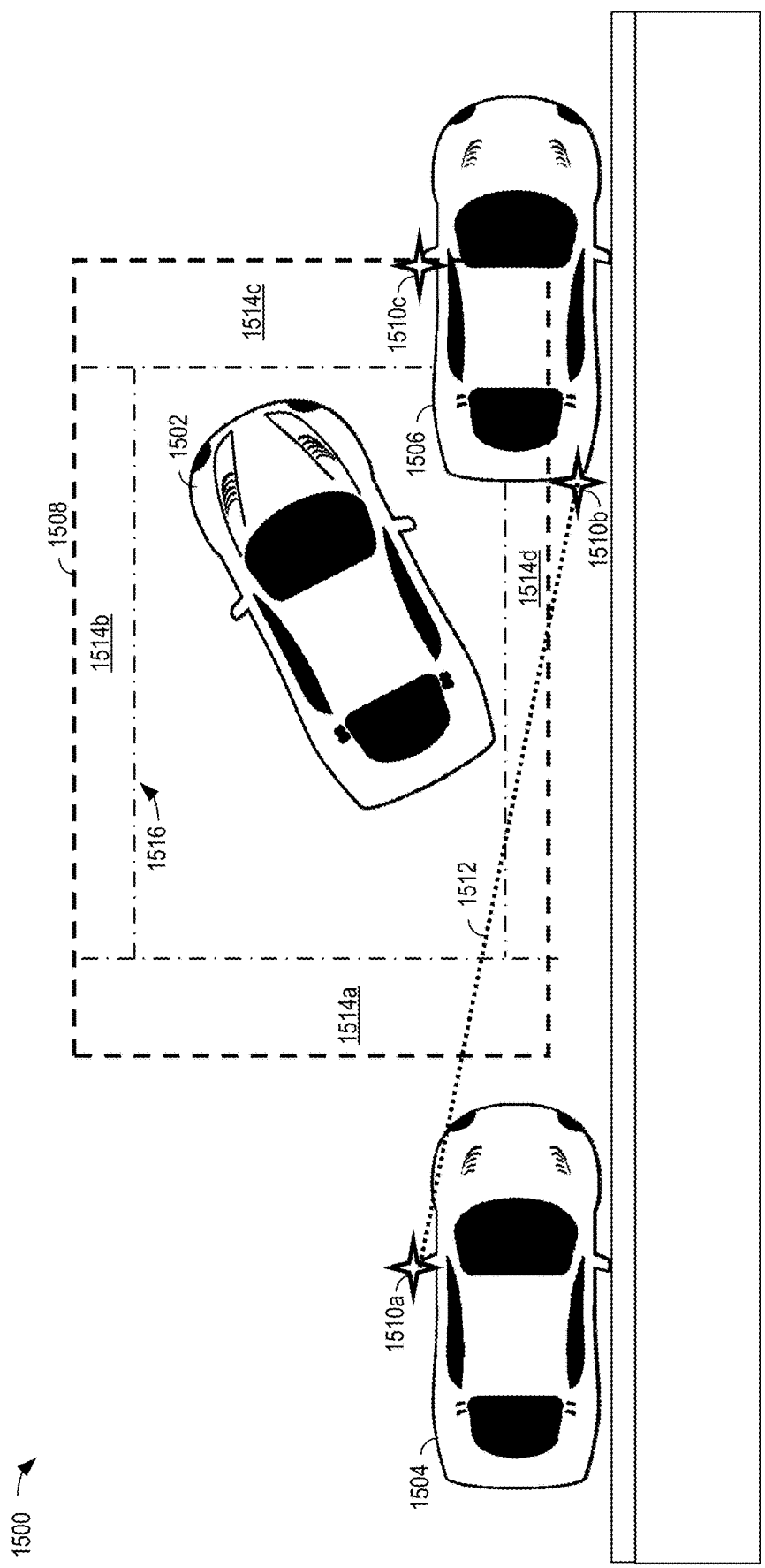
Figure 15D:
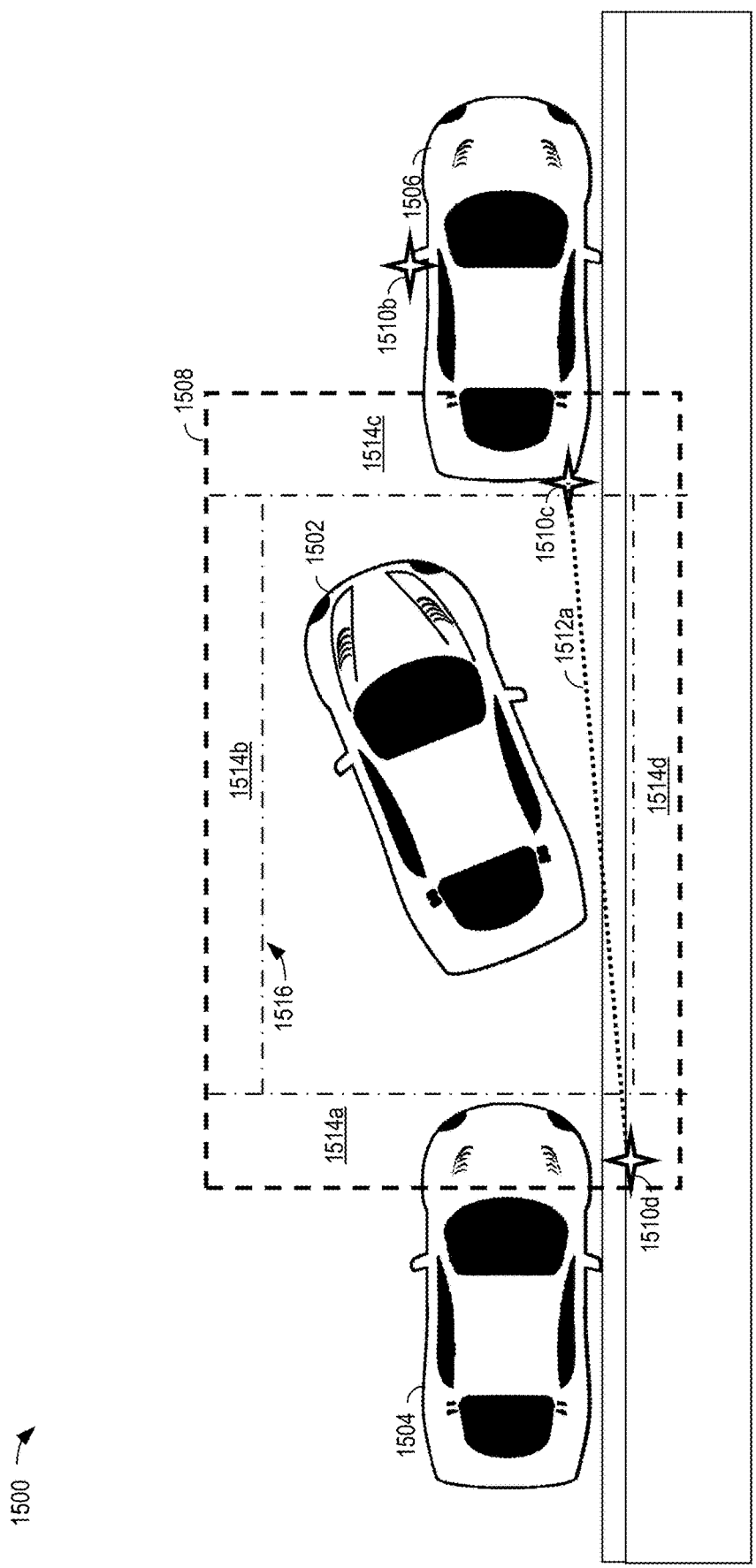

As shown in FIG. 15C, the virtual view 1508 may remain static (e.g., maintain an orientation and position) even as the vehicle changes orientation and position until the vehicle enters a shift zone. For example, as shown in FIG. 15D, the virtual view 1508 is moved responsive to the vehicle 1502 entering shift zone 1514d and is repositioned around the vehicle 1502. As discussed above with respect to FIGS. 14A-14C, a new reference point 1510d is detected and a new reference line 1512a is drawn responsive to the movement of the vehicle 1502.

Figure 16:
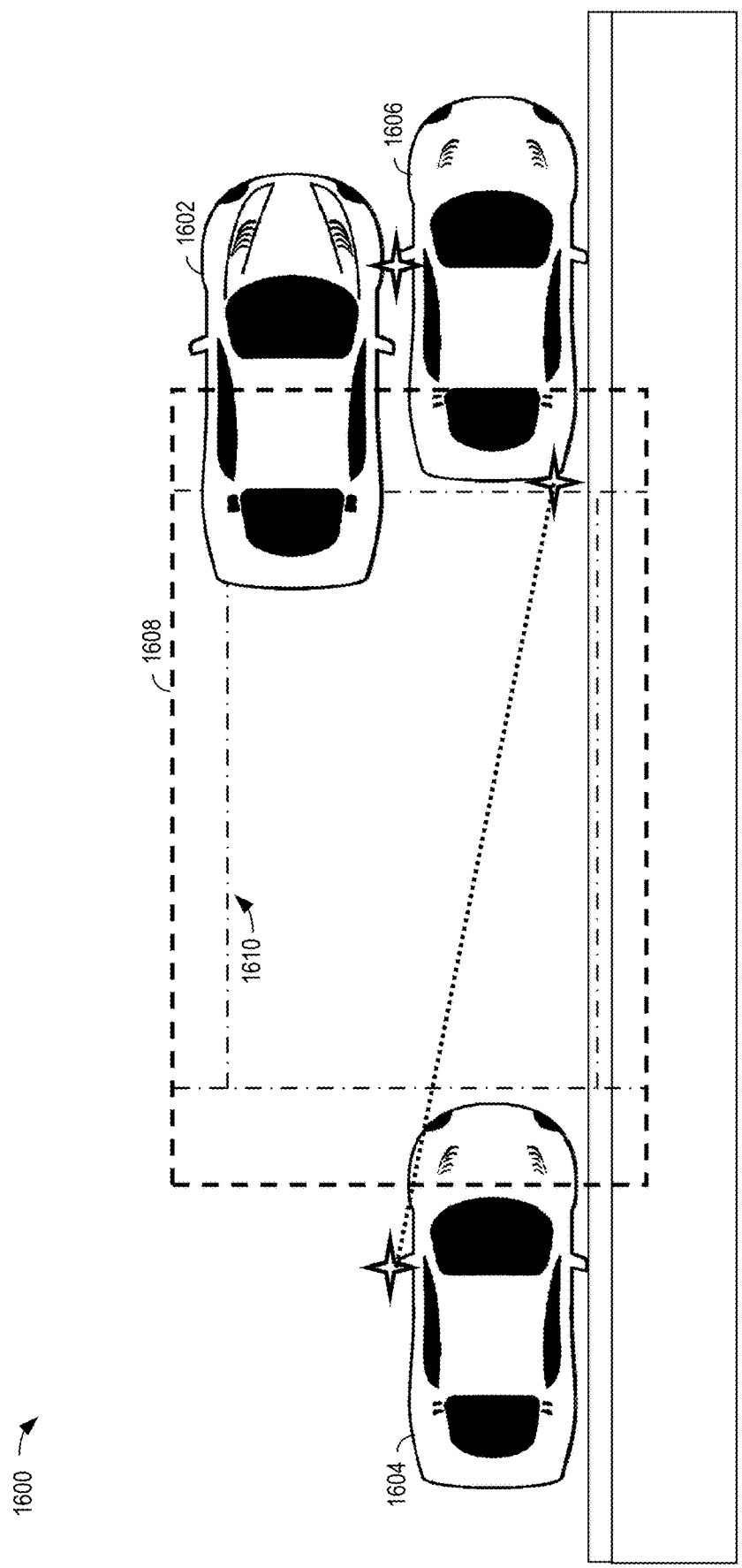
FIGS. 16 and 17 show example scenarios of setting a virtual view of a moving object using shift regions and based on detection of environmental features in accordance with one or more embodiments of the present disclosure.
Figure 17:
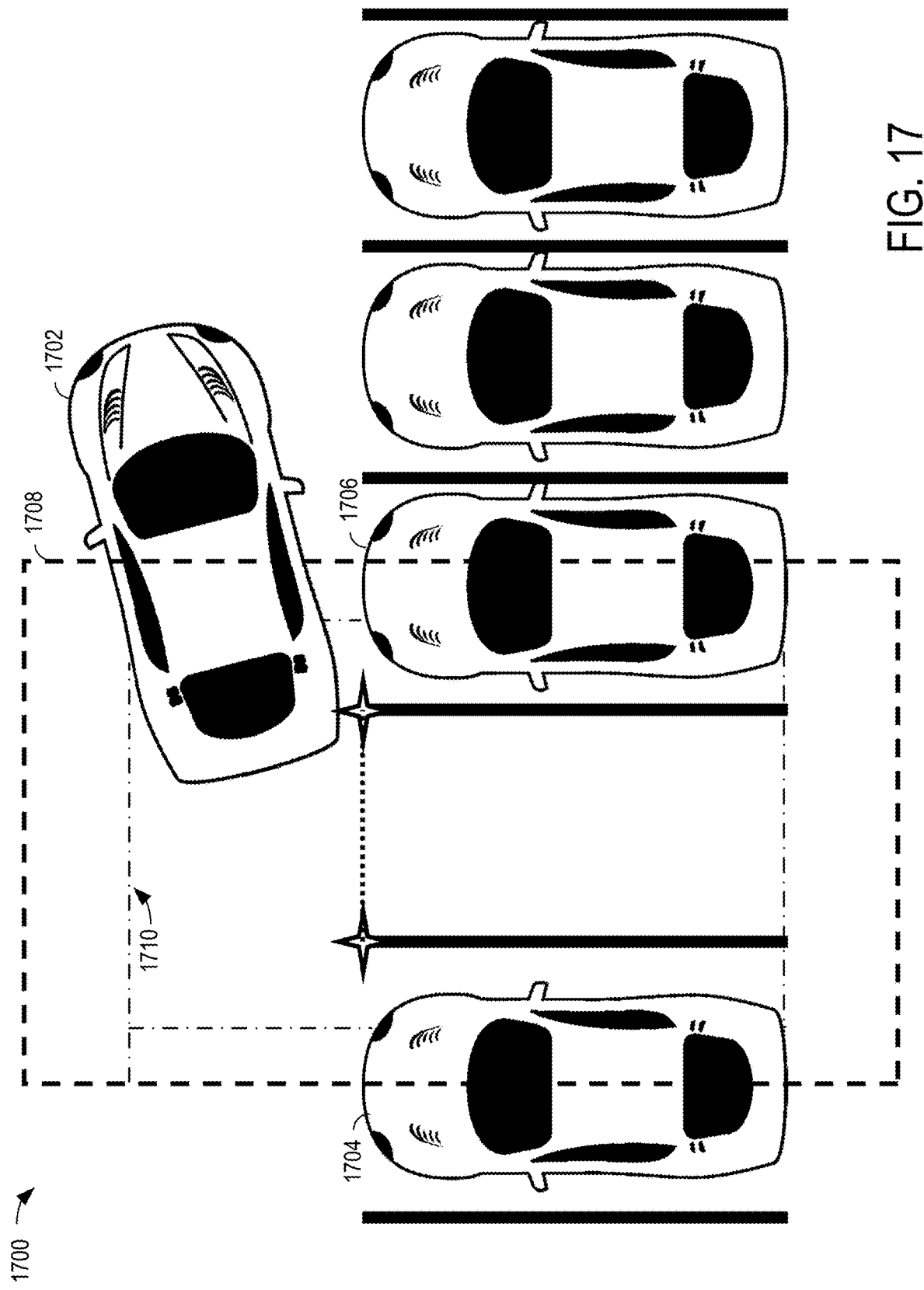

FIGS. 16 and 17 show example scenarios of setting a virtual view of a moving object using shift regions and based on detection of environmental features. In each example, the vehicles described (e.g., vehicle 1602 of FIG. 16 and vehicle 1702 of FIG. 17) may correspond to any of the vehicles described herein (e.g., vehicle 100 of FIG. 1A), and may include a virtual view system (such as virtual view system 102 of FIG. 1A) including a plurality of cameras for generating a virtual view of the vehicle and/or the environment of the vehicle. For example, in FIG. 16, the vehicle 1602 may be positioned in a recognizable position relative to vehicles 1604 and 1606 to begin parallel parking between vehicles 1604 and 1606. Responsive to automatic detection of this position and/or user input requesting a static mode, a virtual view 1608 of the vehicle 1602 may be positioned (e.g., repositioned, such as from being centered around vehicle 1602) in a region of interest of environment 1600 (e.g., a parking area). The virtual view 1608 may include shift regions designated by shift lines 1610 as described above with respect to FIGS. 15A-15D. Accordingly, the virtual view 1608 may remain static (e.g., in the same position and orientation relative to the environment) until the vehicle enters the virtual view (e.g., is positioned within the virtual view but outside of the shift regions) and then enters a shift region. The virtual view may also utilize reference points and a reference line as described above with respect to FIGS. 14A-14C.

FIG. 17 shows a similar example to that of FIG. 16, relating to a parking spot in a parking lot, designated by parking lines. For example, in FIG. 17, the vehicle 1702 may be positioned in a recognizable position relative to vehicles 1704 and 1706 to begin parking between vehicles 1704 and 1706. Responsive to automatic detection of this position, the empty parking space (e.g., based on parking lines), and/or user input requesting a static mode, a virtual view 1708 of the vehicle 1702 may be positioned (e.g., repositioned, such as from being centered around vehicle 1702) in a region of interest of environment 1700 (e.g., placed upon the empty parking spot). The virtual view 1708 may include shift regions designated by shift lines 1710 as described above with respect to FIGS. 15A-15D. Accordingly, the virtual view 1708 may remain static (e.g., in the same position and orientation relative to the environment) until the vehicle enters the virtual view (e.g., is positioned within the virtual view but outside of the shift regions) and then enters a shift region. The virtual view may also utilize reference points 1712a and 1712b corresponding to fronts of parking spot lines and a reference line 1714 extending therebetween, where the reference points and line are used as described above with respect to FIGS. 14A-14C.

Figure 18:
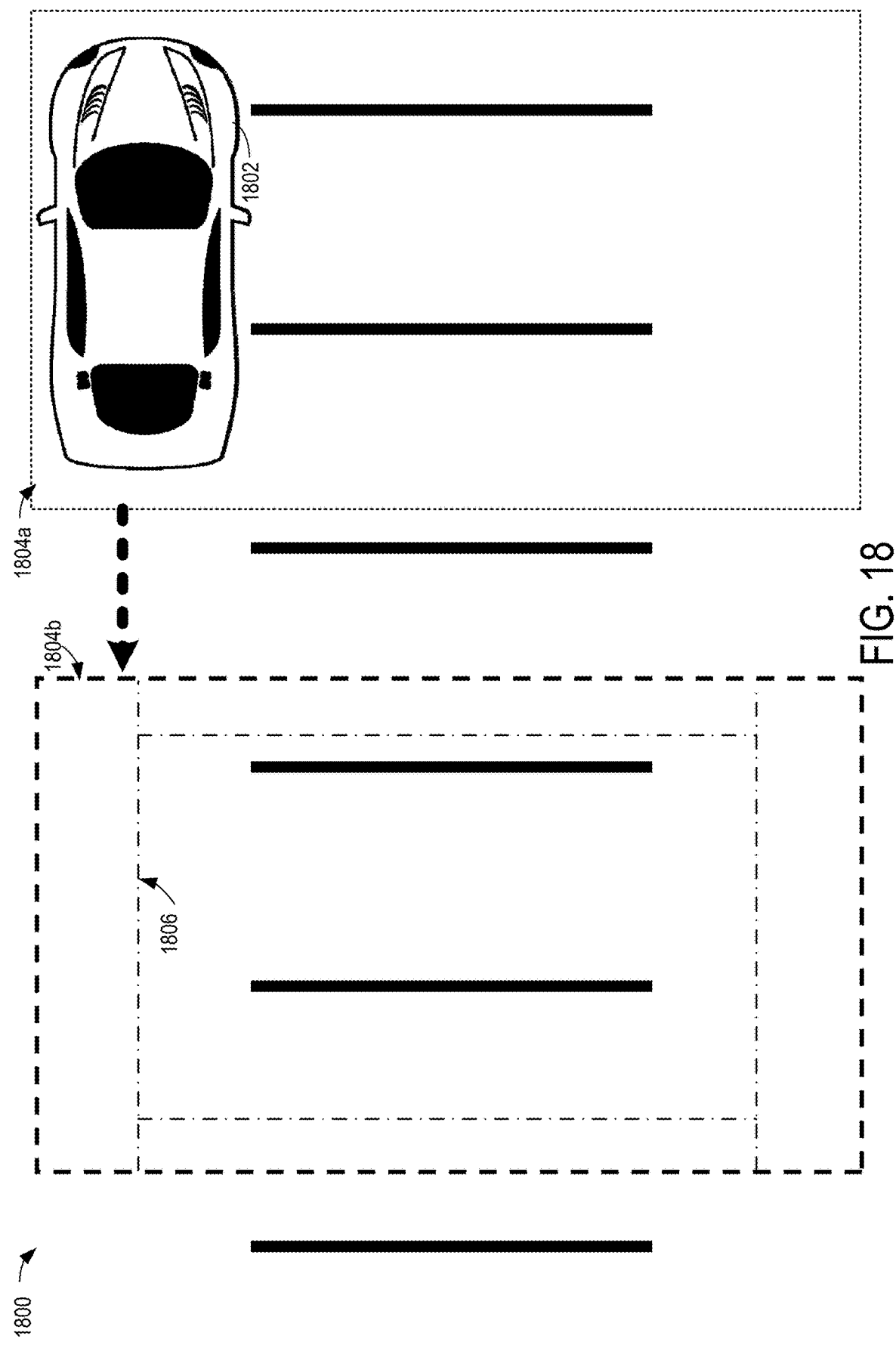
FIG. 18 shows an example scenario of setting a virtual view of a moving object using user input in accordance with one or more embodiments of the present disclosure.

FIG. 18 shows an example scenario of setting a virtual view of a moving object using user input. For example, a vehicle 1802 may be positioned in an environment 1800 (a parking lot in the illustrated example). The vehicle 1802 may correspond to any of the vehicles described herein (e.g., vehicle 100 of FIG. 1A), and may include a virtual view system (such as virtual view system 102 of FIG. 1A) including a plurality of cameras for generating a virtual view 1804 of the vehicle and/or the environment of the vehicle. The virtual view may be initially positioned around the vehicle 1802, as illustrated by dotted lines 1804a. However, the driver may be interested in viewing other positions, such as a parking spot to the rear of the vehicle. Accordingly, the driver may provide user input to the virtual view system to move the virtual view to the position illustrated by dashed lines 1804b. The virtual view at 1804 may include shift lines 1806, which operate as described above with respect to FIGS. 16 and 17 (e.g., to control when the virtual view is moved). In this way, the virtual view may be positioned based on user input (e.g., scrolling the virtual view along a trajectory in an environment then setting the virtual view by selecting a set option), then may remain static (e.g., in a same position and orientation relative to the environment) until the vehicle enters the virtual view region (e.g., within the shift lines) and then enters a shift region.

Another example provides for a method, comprising capturing images from a physical camera mounted on a movable object or a component of the movable object, generating a virtual image (e.g., of the movable object or the component of the movable object) from a virtual position of a virtual camera, the virtual image having a perspective different than the images captured by the physical camera, during a first condition, maintaining the virtual position of the virtual camera even when the movable object or the component of the movable object moves, and during a second condition, moving the virtual position of the virtual camera in coordination with movement of the movable object or movements of the components of the movable object. In a first example of the method, the movable object may additionally or alternatively include components that move, and the virtual image may additionally or alternatively capture movable components of the movable object. A second example of the method optionally includes the first example, and further includes the method, where the virtual position of the virtual camera is different from a physical position of the physical camera. A third example of the method optionally includes one or both of the first and second examples, and further includes the method, wherein moving the virtual position of the virtual camera further comprises moving an orientation of the virtual camera.

Another example provides for a method including capturing images from at least one physical camera coupled to a movable object, generating a virtual image of a virtual camera from the captured images of the at least one physical camera, the virtual image having either a different viewpoint, a different orientation, or a different viewpoint and orientation than the images captured by the at least one physical camera, and automatically maintaining a virtual position of the virtual camera, relative to a reference point, when the at least one physical camera moves relative to the reference point. In a first example of the method, the movement of the at least one physical camera relative to the reference point may additionally or alternatively be directly or indirectly measured in order to maintain the virtual position of the virtual camera relative to the reference point. A second example of the method optionally includes the first example, and further includes the method, wherein an object or part of the object perceived by the at least one physical camera is used in order to maintain the virtual position of the virtual camera relative to the reference point. A third example of the method optionally includes one or both of the first example and the second example, and further includes the method, wherein the at least one physical camera is fixedly mounted to the movable object. A fourth example of the method optionally includes one or more of the first through the third examples, and further includes the method, wherein maintaining the virtual position of the virtual camera further includes maintaining an orientation of the virtual camera. A fifth example of the method optionally includes one or more of the first through the fourth examples, and further includes the method, wherein automatically maintaining the virtual position of the virtual camera, relative to the reference point, when the at least one physical camera moves relative to the reference point comprises automatically maintaining the virtual position of the virtual camera fixed in 3-D grounded space relative to earth while the at least one physical camera and movable object move together relative to the earth. A sixth example of the method optionally includes one or more of the first through the fifth examples, and further includes the method, further comprising detecting a trigger for decoupling the virtual camera from a vehicle-locked position, and generating the virtual image responsive to detecting the trigger. A seventh example of the method optionally includes one or more of the first through the sixth examples, and further includes the method, wherein the trigger is a first trigger, the method further comprising detecting a second trigger, and, responsive to detecting the second trigger, returning the virtual camera to a vehicle-locked position and displaying the virtual view of the vehicle from the virtual perspective of the virtual camera in the vehicle-locked position. An eighth example of the method optionally includes one or more of the first through the seventh examples, and further includes the method, wherein the second trigger comprises determining that the world-locked position is no longer able to be generated from the images captured by the physical camera due to movement of the vehicle away from the world-locked position. A ninth example of the method optionally includes one or more of the first through the eighth examples, and further includes the method, wherein the second trigger comprises determining that a speed of the vehicle exceeds a threshold. A tenth example of the method optionally includes one or more of the first through the ninth examples, and further includes the method, wherein the trigger includes detecting a recognized object associated with a difficult vehicle maneuver. An eleventh example of the method optionally includes one or more of the first through the tenth examples, and further includes the method, wherein the trigger includes detecting an upcoming turn maneuver in a direction of travel of the vehicle. A twelfth example of the method optionally includes one or more of the first through the eleventh examples, and further includes the method, wherein the trigger includes detecting a change in movement of a vehicle in a selected degree of freedom that is above a threshold. A thirteenth example of the method optionally includes one or more of the first through the twelfth examples, and further includes the method, wherein the trigger includes user input.

Another example provides for a virtual view system including a physical camera positioned on an object, a display device, an image processing unit coupled to the physical camera, and a storage device storing instructions executable by the image processing unit to capture, via the physical camera, image data from an associated physical perspective relative to the object, generate, via the image processing unit using the image data from the physical camera, a view of the object from a virtual position of a virtual camera, the virtual camera capturing the view from a virtual perspective that extends from the virtual position toward the object, and the virtual camera being decoupled from the physical camera under a first condition and coupled to the physical camera under a second condition, and display, via the display device, the virtual view of the object, the virtual view appearing static as the object moves while under the first condition and the virtual view appearing to move with the object as the object moves while under the second condition. In a first example of the system, the physical camera additionally or alternatively may be a first physical camera of a plurality of physical cameras positioned on the object, each physical camera of the plurality of physical cameras having a field of view that at least partially overlaps with another physical camera of the plurality of physical cameras.

Another example provides for a method for generating a virtual view of an object, the method comprising capturing, via a plurality of physical cameras mounted on the object, image data from a plurality of at least partially overlapping physical perspectives relative to the object, generating, via an image processing unit using the image data from the plurality of physical cameras, a virtual view of the object from a virtual perspective of a virtual camera, the virtual camera capturing the view from a virtual perspective that extends from the virtual position toward the object, and the virtual position being decoupled from the plurality of physical cameras under a first condition and coupled to the plurality of physical cameras under a second condition, while operating under the first condition, displaying, via a display device of the object, the virtual view of the object, the virtual view appearing static as the object moves, and while operating under the second condition, displaying, via the display device, the virtual view of the object, the virtual view appearing to move with the object as the object moves.

Another example provides for a method for generating a virtual view of a vehicle, the method comprising capturing, via a physical camera mounted on the vehicle, image data from an associated physical perspective relative to the vehicle, receiving, from an image processing unit using the image data from the physical camera, a virtual view of the vehicle from a virtual perspective of a virtual camera, the virtual camera having a vehicle-locked position from which the virtual perspective originates, displaying, via a display device of the vehicle, the virtual view of the object, the virtual view appearing to move with the vehicle as the vehicle moves, detecting a trigger for decoupling the virtual camera from the vehicle-locked position, responsive to detecting the trigger receiving, from the image processing unit using the image data from the physical camera, an updated virtual view of the vehicle from an updated virtual perspective of the virtual camera, the virtual camera having an updated world-locked position from which the updated virtual perspective originates, the updated world-locked position being different from the vehicle-locked position, and displaying, via the display device, the updated virtual view of the vehicle, the updated virtual view appearing to be static relative to the vehicle as the vehicle moves. In a first example of the method, the trigger may additionally or alternatively be a first trigger, and the method may additionally or alternatively further comprise detecting a second trigger, and, responsive to detecting the second trigger, returning the virtual camera to the vehicle-locked position and displaying the virtual view of the vehicle from the perspective of the virtual camera in the vehicle-locked position. A second example of the method optionally includes the first example, and further includes the method, wherein the second trigger comprises determining that a field of view of the virtual camera in the world-locked position no longer includes the vehicle. A third example of the method optionally includes one or both of the first and second examples, and further includes the method, wherein the second trigger comprises determining that a speed of the vehicle exceeds a threshold. A fourth example of the method optionally includes one or more of the first through the third examples, and further includes the method, wherein the image processing unit is included in a cloud computing device, and wherein the virtual view and the updated virtual view are received from the cloud computing device. A fifth example of the method optionally includes one or more of the first through the fourth examples, and further includes the method, wherein the image processing unit is included in an in-vehicle computing system, and wherein the virtual view and the updated virtual view are received from the in-vehicle computing system. A sixth example of the method optionally includes one or more of the first through the fifth examples, and further includes the method, wherein the trigger includes detecting a recognized object associated with a difficult vehicle maneuver. A seventh example of the method optionally includes one or more of the first through the sixth examples, and further includes the method, wherein the trigger includes detecting an upcoming curve in a direction of travel of the vehicle. An eight example of the method optionally includes one or more of the first through the seventh examples, and further includes the method, wherein the trigger includes detecting a change in movement of a vehicle in a selected degree of freedom that is above a threshold. A ninth example of the method optionally includes one or more of the first through the eighth examples, and further includes the method, wherein the trigger comprises a user input.

Another example provides for a virtual view system comprising a physical camera mounted on an object, a display device, a processor, and a storage device storing instructions executable by the processor to capture, via the physical camera, image data from a plurality of perspectives relative to the object, receive, from an image processing unit using the image data from the physical camera, a virtual view of the object from a virtual perspective of a virtual camera, the virtual camera having a virtual position from which the virtual perspective is captured, the virtual position remaining static relative to movement of the physical camera under a first condition and the virtual position moving in a coordinated manner with the plurality of physical cameras under a second condition, and display, via the display device, the virtual view of the object, the virtual view appearing static in at least a first degree of freedom under the first condition and the virtual view appearing to move in at least the first degree of freedom with the object under the second condition. In a first example of the system, the image processing unit may additionally or alternatively be included in a cloud computing system and the virtual view may additionally or alternatively be generated remotely from the virtual view system. A second example of the system optionally includes the first example, and further includes the system, wherein the image processing unit is included in the object and wherein the virtual view is generated locally to the virtual view system. A third example of the system optionally includes one or both of the first and second examples, and further includes the system, wherein the object is a vehicle configured to move via one or more tracks of the vehicle, wherein the first degree of freedom corresponds to rotational movement of components of the vehicle, and wherein, under the first condition, the virtual position of the camera corresponds to a location on the track(s) or locked with reference to the track(s) and moves with the vehicle as the vehicle moves along or via the track(s).

Another example provides for a cloud computing system comprising a network interface communicatively coupled to a vehicle, an image processing unit, and a storage device storing instructions executable by the processor to receive, via the network interface, images from the vehicle, the images captured by a physical camera mounted on the vehicle, generate a virtual image of the vehicle from a virtual position, the virtual image having a perspective different than the images captured by the physical camera, during a first condition, maintaining the virtual position of the virtual camera even when the movable object or components of the movable object move, during a second condition, moving the virtual position of the virtual camera in coordination with movement of the movable object or components of the movable object, and transmit, via the network interface, the virtual image to the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as virtual view system 102 of FIG. 1A and/or in-vehicle computing system 109 of FIG. 1B and/or in-vehicle computing system 1300 of FIG. 13. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
capturing images from at least one physical camera coupled to a movable vehicle;
generating a virtual image of a virtual camera from the captured images from the at least one physical camera, the virtual image having either a different viewpoint, a different orientation, or a different viewpoint and orientation than the images captured from the at least one physical camera, the virtual image displayed on a display distinct from a windshield of the vehicle; and
automatically maintaining a virtual position of the virtual camera, relative to a reference point, when the at least one physical camera moves relative to the reference point, while displaying the virtual image on the display, wherein the virtual image further includes a reference line between reference points determined to provide a guide for maintaining an orientation of the virtual image, the virtual image maintaining the reference line in a parallel position to itself across each frame of the virtual image.

2. The method of claim 1, wherein automatically maintaining the virtual position of the virtual camera relative to the reference point is based on movement of the at least one physical camera relative to the reference point.

3. The method of claim 1, wherein an object or a part of the object perceived by the at least one physical camera is used in order to maintain the virtual position of the virtual camera relative to the reference point, wherein the at least one physical camera is fixedly mounted to the vehicle, and wherein maintaining the virtual position of the virtual camera further comprises maintaining an orientation of the virtual camera.

4. The method of claim 1, wherein automatically maintaining the virtual position of the virtual camera relative to the reference point is performed during a parallel park operation.

5. The method of claim 1, wherein automatically maintaining the virtual position of the virtual camera relative to the reference point, when the at least one physical camera moves relative to the reference point, comprises automatically maintaining the virtual position of the virtual camera fixed in 3-D grounded space relative to earth while the at least one physical camera and the vehicle move together relative to the earth.

6. The method of claim 1, further comprising detecting a trigger for decoupling the virtual camera from a vehicle-locked position, and generating the virtual image responsive to detecting the trigger.

7. The method of claim 6, wherein the trigger is a first trigger, the method further comprising detecting a second trigger, and, responsive to detecting the second trigger, returning the virtual camera to the vehicle-locked position and displaying a virtual view of the vehicle from a virtual perspective of the virtual camera in the vehicle-locked position.

8. The method of claim 7, wherein the second trigger comprises determining that a world-locked position is no longer able to be generated from the images captured from the at least one physical camera due to movement of the vehicle away from the world-locked position.

9. The method of claim 7, wherein the second trigger comprises determining that a speed of the vehicle exceeds a threshold.

10. The method of claim 6, wherein the trigger includes detecting an object within a vicinity of the vehicle.

11. The method of claim 6, wherein the trigger includes detecting an upcoming turn maneuver in a direction of travel of the vehicle.

12. The method of claim 6, wherein the trigger includes detecting a change in movement of the vehicle in a selected degree of freedom that is above a threshold.

13. The method of claim 6, wherein the trigger comprises user input.

14. A virtual view system comprising:
at least one physical camera positioned on a vehicle;
a display device;
an image processing unit coupled to the at least one physical camera; and
a storage device storing instructions executable by the image processing unit to:
capture, via the at least one physical camera, image data from an associated physical perspective relative to the vehicle;
generate, via the image processing unit using the image data from the at least one physical camera, a view of the vehicle from a virtual position of a virtual camera, the virtual camera capturing the view from a virtual perspective that extends from the virtual position in a direction of interest, and the virtual camera being decoupled from the at least one physical camera under a first condition;
generate, via the image processing unit using the image data from the at least one physical camera, a reference line between reference points determined to provide a guide for maintaining an orientation of the view from the virtual perspective, the view maintaining the reference line in a parallel position to itself across each frame of the view, and
display, via the display device, the view from the virtual perspective, the view appearing static as the at least one physical camera moves with the vehicle while under the first condition,
wherein the view from the virtual perspective further includes a reference line between reference points determined to provide a guide for maintaining an orientation of the view from the virtual perspective, the view from the virtual perspective maintaining the reference line in a parallel position to itself across each frame of the view from the virtual perspective, and
wherein the virtual camera is coupled to the at least one physical camera under a second condition, the view appearing to move with the vehicle under the second condition.

15. The virtual view system of claim 14, wherein the instructions further include instructions to detect a trigger for decoupling the virtual camera from the at least one physical camera in the first condition and switching to the second condition, wherein the trigger is a first trigger, the method further comprising detecting a second trigger, and, responsive to detecting the second trigger, returning the virtual camera to be coupled to the at least one physical camera, wherein the second trigger comprises determining movement of the vehicle away from a world-locked position.

16. The virtual view system of claim 14, wherein the at least one physical camera is a first physical camera of a plurality of physical cameras positioned on the vehicle, each physical camera of the plurality of physical cameras having a field of view that at least partially overlaps with another physical camera of the plurality of physical cameras.

17. The virtual view system of claim 14, wherein the display device is integrated or positioned in the vehicle.

18. The virtual view system of claim 14, wherein the display device is remote from the vehicle.

19. A virtual view system comprising:
a physical camera mounted on an object;
a display device coupled below a windshield;
a processor; and
a storage device storing instructions executable by the processor to:
capture, via the physical camera, image data from a plurality of perspectives relative to the object;
receive, from an image processing unit using the image data from the physical camera, a virtual view of the object from a virtual perspective of a virtual camera, the virtual camera having a virtual position from which the virtual perspective is captured, the virtual position remaining static relative to movement of the physical camera under a first condition and the virtual position moving in a coordinated manner with the plurality of physical cameras under a second condition;
identify, via the processor, reference points in the image data relative to the object, wherein the reference points are relevant to a detected driving maneuver;
calculate, via the processor, a reference line between the identified reference points determined to provide a guide for maintaining an orientation of the virtual view,
display, via the display device, the virtual view of the object, the virtual view appearing static in at least a first degree of freedom under the first condition and the virtual view appearing to move in at least the first degree of freedom with the object under the second condition, and
display within the virtual view of the object, the reference line, wherein the virtual view maintains the reference line in a parallel position to itself across each frame of the virtual view.

20. The virtual view system of claim 19, wherein the image processing unit is included in a cloud computing system and wherein the virtual view is generated remotely from the virtual view system.

21. The virtual view system of claim 19, wherein the image processing unit is included in the object and wherein the virtual view is generated locally to the virtual view system.

22. The virtual view system of claim 19, wherein the object is a first part of a vehicle, said first part able to move independently from at least a second part of the vehicle, wherein the physical camera is mounted on the first part of the vehicle and the virtual camera remains static with regard to the second part of the vehicle.

* * * * *